(12) United States Patent
Buil et al.

(10) Patent No.: US 8,253,693 B2
(45) Date of Patent: Aug. 28, 2012

(54) DEVICE CAPABLE OF BEING OPERATED WITHIN A NETWORK, NETWORK SYSTEM, METHOD OF OPERATING A DEVICE WITHIN A NETWORK, PROGRAM ELEMENT, AND COMPUTER-READABLE MEDIUM

(75) Inventors: Vincent P. Buil, Eindhoven (NL); Bartel Marinus Van De Sluis, Eindhoven (NL); Heribert Baldus, Aachen (DE); Thomas Falck, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1156 days.

(21) Appl. No.: 11/816,283

(22) PCT Filed: Feb. 13, 2006

(86) PCT No.: PCT/IB2006/050466
§ 371 (c)(1), (2), (4) Date: Aug. 15, 2007

(87) PCT Pub. No.: WO2006/087670
PCT Pub. Date: Aug. 24, 2006

(65) Prior Publication Data
US 2008/0259043 A1      Oct. 23, 2008

(30) Foreign Application Priority Data
Feb. 17, 2005    (EP) .................................. 05101207

(51) Int. Cl.
*G09G 3/041* (2006.01)

(52) U.S. Cl. ......... 345/173; 345/1.2; 345/158; 345/174; 345/1.1; 345/3.1; 345/156; 345/169; 345/175; 463/35; 463/36

(58) Field of Classification Search .......... 345/173–174, 345/1.1, 1.2, 3.1, 156, 158, 169, 175; 340/5.8; 713/168, 193; 178/18.01–18.07; 463/35, 463/36
See application file for complete search history.

(56) References Cited

U.S. PATENT DOCUMENTS
5,914,701 A    6/1999  Gersheneld et al.
(Continued)

FOREIGN PATENT DOCUMENTS
EP    1096722 A2    5/2001
EP    1100218 A2    5/2001
(Continued)

OTHER PUBLICATIONS

Rekimoto et al: "Synctap: an Interaction Technique for Mobile Networking"; Mobile HCI 2003, http://www.csl.sony.co.jp/person/rekimoto/papers/mhci03.pdf.

*Primary Examiner* — Lun-Yi Lao
*Assistant Examiner* — Olga Merkoulova

(57) ABSTRACT

A device (A) is described, which is capable of being operated within a network comprising a touch interface (2) which is adapted to detect that a user (3) touches the touch interface (2) and simultaneously touches a touch interface (6) of another device (B) capable of being operated within a network, and a communication unit (1) adapted to communicate with a communication unit (5) of the other device (B) via a communication network established between the device (A) and the other device (B) when detecting that the user touches the touch interface (2) of the device (A) and simultaneously touches the touch interlace (6) of the other device (B).

20 Claims, 16 Drawing Sheets

U.S. PATENT DOCUMENTS

| | | | |
|---|---|---|---|
| 6,032,202 A * | 2/2000 | Lea et al. | 710/8 |
| 6,211,799 B1 | 4/2001 | Post et al. | |
| 7,202,773 B1 * | 4/2007 | Oba et al. | 340/5.8 |
| 7,884,805 B2 * | 2/2011 | Thorn | 345/173 |
| 2002/0128030 A1 * | 9/2002 | Eiden et al. | 455/519 |
| 2008/0039212 A1 * | 2/2008 | Ahlgren et al. | 463/46 |

FOREIGN PATENT DOCUMENTS

| | | |
|---|---|---|
| EP | 1220501 A2 | 7/2002 |
| JP | 0717215 A | 7/1995 |
| JP | 0717215 A1 | 7/1995 |
| JP | 2001-195368 * | 7/2001 |
| WO | WO03093950 A2 | 11/2003 |

* cited by examiner

DEVICE CAPABLE OF BEING OPERATED WITHIN A NETWORK, NETWORK SYSTEM, METHOD OF OPERATING A DEVICE WITHIN A NETWORK, PROGRAM ELEMENT, AND COMPUTER-READABLE MEDIUM

FIELD OF THE INVENTION

The invention relates to a device capable of being operated within a network.

The invention also relates to a network system.

The invention further relates to a method of operating a device within a network.

Moreover, the invention relates to a program element.

Furthermore, the invention relates to a computer-readable medium.

BACKGROUND OF THE INVENTION

An increasing number of users are interested in hard disk-based portable audio/video players, powerful and intelligent cellular phones, and other portable entertainment equipment.

Known portable audio players usually have only one headphone output jack. If music, which is currently played back by the audio player of a user, is to be shared with another user, it is necessary to unplug the headphone from the audio player and to let the other user plug in. After having plugged in to the audio player of the first user, the second user can listen via his headphone to the music played back by the first user's audio player.

Alternatively, it is possible to implement an audio splitter enabling two users to simultaneously listen to the same music with two headphones.

WO 2003/093950 A2 discloses a system for sharing music between individuals through portable audio devices by transmitting music signals from one device to another. The communication between the two devices is realized by using inter-unit transmitter/receiver units.

Setting up an ad-hoc wireless communication network requires proper configuration of various parameters. In particular, a user has to configure the network type, network name, network addresses, communication and security parameters for all the devices involved. Usually, this is done manually according to the prior art, following installation procedures. For instance, a Windows XP installation procedure can be monitored on a display but requires user input via a keyboard.

Windows Smart Network Key (WSNK) is a semi-automatic procedure, deployed along with Windows XP SP2 by Microsoft. WSNK has been adapted to address the growing need for a method of configuring and bootstrapping wireless networking hardware (wireless access points) and wireless clients (including PCs and other devices). A WSNK wizard provides means for a Windows user to easily create and propagate network settings using XML scheme and portable media (for instance, a USB memory stick).

Rekimoto, J et al., "SyncTap: An Interaction Technique for Mobile Networking" (MOBILE HCI 2003, http://www.csl.sony.co.jp/person/rekimoto/papers/mhci03.pdf) discloses a user interface technique for making a network connection between digital devices. When a user wants to connect two devices, he synchronously presses and releases a "connection" button on both devices.

Existing wireless communication systems such as Bluetooth or WLAN (wireless local area network) suffer from the problem that the end user acceptance to establish links is low, because much manual interaction by a user is needed, which makes setting up the wireless link a difficult and cumbersome task.

Wireless communication technology such as Bluetooth provides device discovery mechanisms for establishing a new network. However, wireless devices are vulnerable to misuse. For instance, in an airport lounge, an unauthorized user can connect to a mobile phone and misuse it without being noticed, since it works within the spatial range of Bluetooth. In addition, Bluetooth discovery procedures are time-consuming, which makes setting up a network to a trial of patience for the user.

Semi-automatic solutions require additional dedicated expensive set-up devices and lack ease of use as desired by a user. In addition, systems broadcasting network parameters through a wireless link are prone to eavesdropping.

In known automatic solutions, the user has no sufficient control of those devices that are allowed to connect with the user's device.

Thus, according to the related art, there is no system which allows easy and secure establishment of a network between different devices.

OBJECT AND SUMMARY OF THE INVENTION

It is an object of the invention to establish a network in a simple and secure manner.

This object may be achieved by providing a device capable of being operated within a network, a network system, a method of operating a device within a network, a program element, and a computer-readable medium having the features as defined in the independent claims.

In one embodiment of the invention, a device capable of being operated within a network is provided, the device comprising a touch interface adapted to detect that a user touches the touch surface and simultaneously touches a touch surface of another device capable of being operated within a network. Furthermore, the device comprises a communication unit adapted to communicate with a communication unit of the other device via a communication network established between the device and the other device when detecting that the user touches the touch interface of the device and simultaneously touches the touch interface of the other device.

In another embodiment of the invention, a network system is provided, comprising a first device having the above-mentioned features and being capable of being operated within a network, and a second device having the above-mentioned features and being capable of being operated within the network.

In yet another embodiment of the invention, a method of operating a device within a network is provided, the method comprising the steps of detecting that a user touches the device and simultaneously touches another device capable of being operated within a network, and communicating with the other device via a communication network established between the device and the other device when detecting that the user touches the device and simultaneously touches the other device.

In a further embodiment of the invention, a program element is provided, which, when being executed by a processor of the device, is adapted to control or carry out a method employing the above-mentioned method steps of operating the device within a network.

Moreover, in yet another embodiment of the invention, a computer-readable medium is provided, in which a computer program is stored which, when being executed by a processor of a device, is adapted to control or carry out a method having the above-mentioned features of operating the device within a network.

The network establishment scheme according to the invention can be realized by a computer program, i.e. by software, or by using one or more special electronic optimization circuits, i.e. in hardware, or in hybrid form, i.e. by means of software components and hardware components.

The characterizing features according to the invention particularly have the advantage that a system is created in which a network can be intuitively established by a user without any skills and in such a manner that any misuse is securely avoided. To establish a network between two devices, the user simply simultaneously touches touch interfaces of both devices to be connected to a network. Via the user's body, i.e. via intra-body communication, signals may then be exchanged between the two devices containing control and/or address information needed to connect the devices in a common network. Since the user closes the open connection between the two devices in an intuitive manner, he can easily instruct the devices to build up a network. The devices may exchange data required for establishing the network and may then establish the communication network. When the network has been established automatically, application data may be exchanged between the two devices via the communication units, which may be operated, for instance, in a wireless manner. In other words, a first path for initiating the network with the user's body forming the communication channel is separated from a second path for communication via the network. Thus, the initiation of the network is optimized to be intuitive, and the communication via the network may be optimized to be fast.

With the network establishment scheme according to the invention, problems of existing wireless communication systems such as Bluetooth or WLAN are overcome, namely, setting up a wireless link is no longer a difficult and cumbersome task for inexperienced users.

According to an embodiment of the invention, a system and a method are described to establish a wireless communication between two devices by just touching them at the same time. The communication between the two wireless devices may start on the basis of intra-body communication to exchange all relevant data for establishing a wireless ad-hoc network, and may then switch to a wireless system for transmitting the real application data. The technology of intra-body communication is explained in another context, for instance, in U.S. Pat. No. 6,211,799 or U.S. Pat. No. 5,914,701.

In a similar manner, a wireless device can join an existing wireless network by just touching the new device and by touching any device belonging to the network that has already been established. The scheme according to the invention can be applied in all domains (for instance, in consumer, professional, or medical domains) where networks (like wireless ad-hoc networks) are being deployed, and can be applied to all types of wireless technologies such as Bluetooth, WLAN (according to the IEEE 802.11 Standard), ZigBee (according to the IEEE 802.15.4 Standard), or the like. ZigBee particularly denotes a standard for short-distance, low data-rate communication using the frequencies and physical and data layers of the IEEE 802.15.4 PHY specification and has been created and maintained by the ZigBee Alliance Group.

According to an aspect of the invention, intra-body communication (i.e. using the human body as a signal transmission medium or cable replacement) may be used as an enabler for wireless communication technology such as Bluetooth, WPAN (Wireless Personal Area Network), and WLAN (Wireless Local Area Network). The communication between two wireless devices may start on the basis of intra-body communication to exchange all relevant data for establishing a wireless ad-hoc network and may then switch to the wireless system for transmitting the real application data.

According to an embodiment of the invention, a virtual connector may be added to the wireless devices for quickly establishing wireless communication. By just simultaneously touching two devices implementing the virtual connector functionality, these devices may automatically and invisibly configure themselves and may initiate a wireless ad-hoc network enabling devices to communicate, while using wireless technologies. In an environment of wireless enabled devices, this is an easy way to set up connections without the need to go through a complicated network set-up procedure.

When a user simultaneously touches two wireless devices which are enabled by means of a virtual connector function, the virtual connectors of these devices communicate with each other through intra-body communication. The virtual connectors may exchange network configuration parameters, wake up radio sub-systems (communication units) of the devices they are belonging to, and initiate the establishment of a wireless ad-hoc network.

In a similar manner, a device (for instance, a wireless device) can join an existing (for instance, wireless) network when a user just touches the new device and any device belonging to the network that has already been established.

It is an advantage of the scheme provided by the invention that a very intuitive network set-up is enabled, just by touching two devices to connect them. The network set-up according to the invention is easy and fast, so that a complicated and time-consuming manual network configuration can be dispensed with. After having touched the devices, the network is instantly established. Lengthy and time-consuming Bluetooth inquiry procedures are avoided.

Furthermore, the network set-up scheme according to the invention has a high level of security. Devices can be set to a non-discoverable mode. It may thereby be prevented that other wireless devices within the wireless technology range (for instance, 10 m to 100 m) discover the device and connect to it without being noticed.

The network system according to the invention is very convenient for a user. No dedicated set-up device is required. The devices having a virtual connector function and the user's body are sufficient to create a wireless network. In addition, the network establishment scheme according to the invention also works when the devices are placed on or close to the body. This is advantageous for devices which are typically carried in the user's pocket (for instance, a mobile phone) or for body-worn devices (for instance, medical sensors).

According to the invention, it is possible to increase the lifetime of a battery or another energy supply unit for providing energy to the devices between which a network is established. The relatively high power consumption of the communication unit, for instance, adapted to exchange radio frequency signals with another device in a wireless manner, can sleep most of the time, until a virtual connector has discovered another wireless device through ultra-low power intra-body communication and wakes up the radio sub-system (communication unit). No regular Bluetooth inquiries are necessary.

Thus, a wireless enabler based on intra-body communication is provided according to an embodiment of the invention. An embodiment of the system according to the invention can be described as follows. Wireless devices may be enhanced by a virtual connector (VC) and an intra-body communication interface. When a user touches both devices at the same time, network communication parameters may be exchanged through intra-body communication. Then, the virtual connector may be waked up and instruct a radio communication system to establish a wireless ad-hoc network. Afterwards, real application data can be transmitted through the wireless link between the devices.

Examples of applications of the inventions are all domains in which networks, in particular wireless ad-hoc networks, are deployed, and all types of wireless technologies such as Bluetooth, WLAN (IEEE 802.11) or ZigBee (IEEE 802.15.4).

Examples of application areas include enabling Bluetooth connectivity of mobile devices such as mobile phones and PDAs (Personal Digital Assistants), e.g. between mobile devices for peer-to-peer applications, mobile phones and headsets, mobile phones and personal computers for data synchronization, mobile phones and television sets for displaying images. The invention may further be applied in the field of wireless consumer electronics (CE) home network, such as TV sets, VCRs, etc. Other fields of application are wireless ad-hoc computer networks, such as personal computers, printers, PDAs, etc. Furthermore, the invention allows establishment of a body area network. This means that body-worn devices are automatically connected with each other by just sticking them on the body. This can be exploited for consumer electronics applications (e.g. connecting MP3 players and headsets), medical applications (patient monitoring/personal healthcare: connecting medical sensors such as ECGs, blood pressure sensors, temperature sensors) within and outside hospitals. It is further possible to associate body-worn devices with peripheral devices, e.g. ECG sensors and bedside monitors for patient monitoring, integration of wireless scale to body area networks for personal healthcare applications, etc.

Another embodiment of the invention is related to the aspect that a person listening to audio music by using an audio player and a headphone can simply touch his own audio player and a headphone of another user to establish a network so that the other person may listen to music played back currently by the audio player of the first user as well.

Particularly when wireless headphones are used, there has hitherto been no intuitive solution to indicate that a user wishes to listen with his headphone to the music played back by the audio player of another user. According to the invention, a first user may simply touch the headphone of a second user to indicate that the first user wants to listen to the audio content played back with the audio player of the second user. Simultaneously, the first user may touch his own audio player explicitly with his hand, or implicitly by wearing the audio player close to his body. A network may thereby be automatically established between the audio players and the users' headphones via intra-body communication. A network identifier may be sent to the headphone of the second user via intra-body data transfer. This identifier may then be sent to the second user's audio player, which may then set up a wireless network with the first audio player to transmit the music.

The described aspect of the invention can also be applied to personal data classes (for instance, head-mounted displays) for viewing photos or movies together, i.e. to share visual content.

By simultaneously touching his associated audio player and another user's headphone, a user may indicate to the other user's headphone that he wants to listen to the music from the audio player of the other user. Subsequently, and as a consequence of simultaneously touching his own audio player and the other user's headphone, a wireless communication (for instance, via Bluetooth, WPAN, etc.) may be set up between the user's headphone and the other user's audio player.

According to the invention, this can be achieved in that a first user simply touches another user's headphone to indicate that music from the player of the other user should now also be sent to the headphone of the first user. The first and the second user can then listen simultaneously to the music from the audio player of the second user for a while. As soon as a first user touches his own headphone and simultaneously his own player again, he will continue listening to his own music.

The invention thus provides an interactive and intuitive method of sharing media content (particularly of sharing a listening/viewing experience) between two or more portable media players and assigned users, for instance, via wireless personal area networks like WPAN or Bluetooth.

Referring to the dependent claims, further embodiments of the invention will be described hereinafter.

Embodiments of the device of the invention will now be described. These embodiments may also apply to the network system, the method of operating a device within a network, the program element and the computer-readable medium according to the invention.

When detecting that a user touches the touch interface and simultaneously touches the touch interface of the other device, the touch interface may be adapted to exchange data required for establishing the network with the touch interface of the other device. When the data required for establishing a network are exchanged, the network can be established between the two devices, and the network communication can be performed via the communication units of the device and of the other device.

When detecting that a user touches the touch interface and simultaneously touches the touch interface of the other device, the touch interface may further be adapted to exchange data required for establishing the network with the touch interface of the other device, via intra-body communication. According to this embodiment, necessary commands and address information required to establish a network between the two devices are transmitted via intra-body communication, i.e. from one touch interface to the other touch interface via the user's body. The human body connecting the two touch interfaces thus electrically functions as a cable replacement, so that the intuitive action of touching both touch interfaces of the devices to be connected with one another via the network automatically results in the establishment of the network, without the further need of user interference.

When exclusively (i.e. only) detecting that a user touches the touch interface and simultaneously touches the touch interface of the other device, the touch interface may be adapted to be activated to start sending data required for establishing the network to the touch interface of the other device. Touching the touch interface of the device may thus be detected by a sensor of the touch interface and force the system to be activated to start sending data. In other words, in the absence of a user touching the touch interface or interfaces, no data are provided at the touch interface for transmission to another touch interface. This allows a power-saving operation, since the generation of signals is only necessary when the touch sensor detects that a human user touches the touch interface. This can be detected, for instance, electronically or by measuring the conductance, capacitance, or temperature of the touch interface, which may be characteristically modified when a human user touches the touch interface.

Alternatively, the touch interface may be adapted to continuously or periodically send data (regardless of whether a user is currently touching or not touching the touch interface), which data are required for establishing the network, and this in such a manner that these data are receivable by the touch interface of the other device only when a user touches the touch interface and simultaneously touches the touch interface of the other device. According to such a "polling" scheme, the device emits data required for establishing a network communication periodically, for instance, once a second. These data can be transmitted to the other device and thus used for establishing a network communication only when a human body electronically bridges the two touching interfaces of the two devices. According to this embodiment, a sensor for detecting whether a user currently touches the touch interface can be dispensed with.

According to another embodiment, the communication unit of the device may be adapted to communicate with the communication unit of the other device in a wireless manner. While the communication between the touch interfaces is performed in a "pseudo-wired" manner, i.e. via the human body as some kind of replacement of an electrical coupling, the communication between the communication devices may be performed in a wireless manner and thus at a high data rate as soon as the network is established.

The communication unit may be adapted to communicate with the communication unit of the other device according to a communication protocol selected from the group consisting of a Wireless Local Area Network (WLAN), a Wireless Personal Area Network (WPAN), a Bluetooth Network and a ZigBee Network. The corresponding network protocol or protocols may then be stored in the device.

The communication unit of the device may be adapted to communicate with the communication unit of the other device to exchange application data. Whereas network establishment data required for establishing the network between the two devices are at least partially exchanged between the two touch interfaces of the two devices to be connected, the communication via the communication unit may be performed to exchange application data. Such application data may be, for instance, audio content or video content to be transmitted between the two devices. However, also at least a part of data, which is needed for establishing the network between the two devices, may be exchanged via the communication units.

The device may further comprise a connector unit coupled to the touch interface and the communication unit and adapted to activate the communication unit only when detecting that a user touches the touch interface of the device and simultaneously touches the touch interface of the other device. The communication unit (for instance, a unit adapted to communicate via the exchange of electromagnetic waves, particularly in the high-frequency domain) may thus be kept in a low energy sleep mode or standby-mode as long as no network is established between the device and another device, and may be activated selectively as soon as an intra-body communication via the two touch interfaces is sensed. This embodiment allows operation of the device at a very low energy consumption.

According to another embodiment of the invention, the device may be adapted to automatically establish the communication network when detecting that the user touches the touch interface of the device and simultaneously touches the touch interface of the other device. The communication network is thus established automatically and without the need that a user has to follow a complicated network-establishing procedure accompanied by the requirement that the user inputs data, for instance, via a network. According to the described embodiment, the system according to the invention receives the information required for establishing the network by merely exchanging signals through intra-body communication.

The device according to the invention may be adapted to join an existing communication network in which the other device is already operated before detecting that a user touches the touch interface of the device and simultaneously touches a touch interface of another device. The invention may thus not only be applied when there is no network and where devices spontaneously establish a network, but also in a scenario in which a network between a plurality of other devices already exists and the device in question must be connected to this existing network. This connection can be established by simultaneously touching the device to be connected and one of the devices that have already been connected.

The device may be particularly adapted to join an existing communication network in which the other device is already operated as a master before detecting that a user touches the touch interface of the device and simultaneously touches a touch interface of another device. Alternatively, the device may be adapted to join an existing communication network in which the other device is already operated as a slave before detecting that a user touches the touch interface of the device and simultaneously touches a touch interface of another device. If the device of the already existing network, which is touched simultaneously with touching the device to be connected to the network, is a master, the master can manage a direct connection of the device to the network. If the other device is a slave, the slave may inform the master of this network that another device wishes to join the network. Consequently, the master may then exchange data with the device to be connected to the network directly, or via the slave.

The device according to the invention may be adapted to implement at least one functionality of the group consisting of a portable audio player, a portable video player, a headphone, a head-mounted display, a mobile phone, a body-worn device, a medical sensor, a DVD player, a CD player, a hard disk-based media player, an internet radio device, a public entertainment device, and an MP3 player. However, these fields of application are merely examples.

Embodiments of the network system according to the invention will now be described. However, these embodiments also apply to the device capable of being operated within a network, the method of operating a device within a network, the program element and the computer-readable medium.

In the network system, the first and/or the second device may be adapted to reproduce acoustic and/or visual content and/or store reproducible acoustic and/or visual content. In other words, media data may be stored in any one of the first or second devices. However, additionally or alternatively, any one of the first or second devices may be a playback unit to play back such media data.

The first device may be particularly adapted to reproduce acoustic and/or visual content, the second device may be adapted to reproduce acoustic and/or visual content, and a third device having the above-mentioned features may be adapted to store reproducible acoustic and/or visual content to be reproduced by the first device. The first device may be adapted to terminate reproducing acoustic and/or visual content stored in the third device and start to reproduce acoustic and/or visual content which is currently reproduced in the second device when detecting that a user touches the touch interface of the second device and simultaneously touches the touch interface of the third device. In other words, when a user plays back media content stored in the third device and emitted by the first device, and if this user wishes to enjoy media content which is currently reproduced by the second device, then the user simply has to touch the touch interface of the second and the third device. Consequently, a network will be established between the devices, and the first device then also reproduces the media content, which is currently reproduced by the second device. In this manner, the user may share, via the first device, the experience of the media content played back by the second device.

Still referring to the described embodiment, the network may comprise a fourth device having the above-mentioned features which may be adapted to store reproducible acoustic and/or visual content to be reproduced by the second device. When detecting that a user touches the touch interface of the second device and simultaneously touches the touch interface of the third device, acoustic and/or visual content to be reproduced by the first device is transmitted from the communication unit of the fourth device to the communication unit of the first device.

The first device of the network system may further be adapted to terminate reproducing acoustic and/or visual content stored in the fourth device and start to reproduce acoustic and/or visual content stored in the third device when detecting that a user touches the touch interface of the first device and simultaneously touches the touch interface of the third device. For instance, when a user has shared media content with another user for some time and wants to play back his own media content again, he simply touches his own headphone and audio player.

The third and the first device of the network system may be coupled via a wired communication path or via a wireless communication path. For instance, a headphone and an audio player (or a head-mounted device and a video player) may either be connected to one another in a wireless manner or in a conventional wired manner.

According to the described embodiment, touching two headsets or touching two head-mounted devices (i.e. two media data-reproducing units) has no effect. Similarly, touching two audio players or two video players (i.e. two media data-storing units) simultaneously has no effect. However, touching one media data-reproducing unit and one media data-storing unit simultaneously has an effect, since this intuitively allows selection of a desired data transmission direction. However, according to an alternative embodiment of the invention, touching two media data-reproducing units or two media data-storing units simultaneously may have the effect that media content can be shared between two users. In this scenario, it should be possible to determine a desired data transmission direction by providing any appropriate means (for instance, a pushbutton to define a direction).

The touch interface of the first and/or the second device may comprise a user-identifying sensor adapted to identify a user identity of a user touching the touch interface of the device and simultaneously touching the touch interface of the other device. According to this embodiment, at least one of the touch interfaces of the two devices to be connected comprises an identification sensor (for instance, a fingerprint sensor, a DNA sensor or the like) to determine which user currently wants to establish a network. This determined identity may be used to decide whether the user is authorized to access the system of the two devices.

Furthermore, the network system may be adapted in such a manner that a direction of transmitting application data between the first and the second device is determined on the basis of the identified user identity. According to this embodiment, the determined identity information is used as a criterion for a decision which of the two devices to be connected shall be the source, and which shall be the destination of transmitted application data like media content. In other words, the system may use the user identity information to determine the direction of the content streaming, which is an innovative way of using the user identity information.

These and other aspects of the invention are apparent from and will be elucidated with reference to the embodiments described hereinafter.

BRIEF DESCRIPTION OF THE DRAWINGS

The invention will be described in more detail hereinafter with reference to non-limiting examples of embodiments.

FIGS. 10A and 10B show an extension of the state diagram of FIG. 9 illustrating the extension of an existing network in the situation of a new device joining the network.

DESCRIPTION OF EMBODIMENTS

Figure 1:
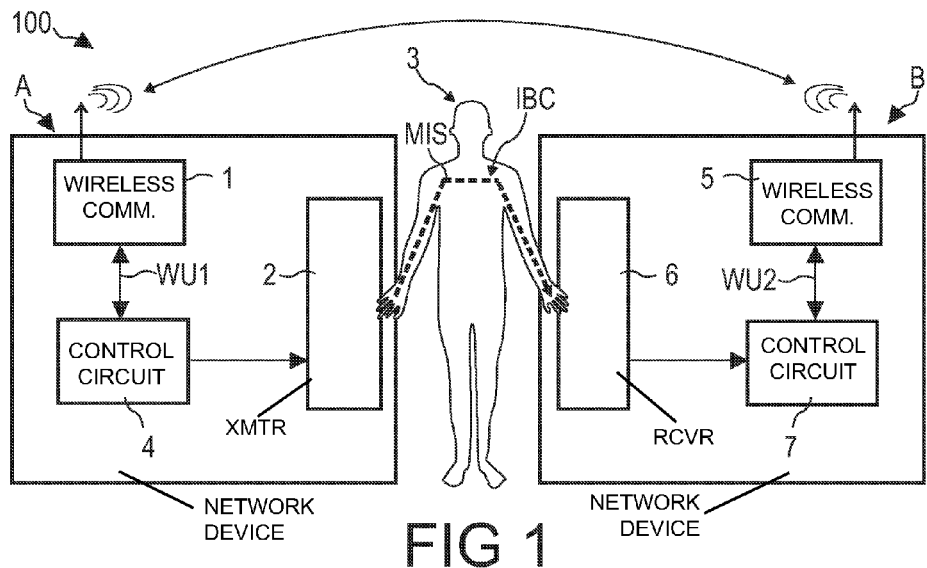
FIG. 1 shows a network system comprising network devices according to an embodiment of the invention.

Specific embodiments of the present invention will now be described by way of example. The illustrations in the drawings are schematic. In different drawings, similar or identical elements are denoted by the same reference signs.

A network system 100 according to an embodiment of the invention will now be described with reference to FIG. 1.

The network system 100 comprises a first network device A and a second network device B. For reasons of simplicity, the network devices will be further referred to as device A and device B, respectively.

Device A comprises a first wireless communicator 1 adapted to establish a wireless connection upon a wake-up signal WU1 and a transmitter 2 adapted to transmit at least a network initiation signal MIS via the body of a living creature, i.e. a user 3 in this case, to the device B, and a first control circuit 4 adapted to generate said wake-up signal WU1 and initiation signal MIS.

Device B comprises a second wireless communicator 5 adapted to establish a wireless connection to device A upon a wake-up signal WU2 and a receiver 6 adapted to receive from said device A at least a network initiation signal MIS via the body of the user 3, and a second control circuit 7 adapted to generate said wake-up signal WU2 based on the initiation signal MIS.

In this case, wireless communicators 1 and 5 are adapted to communicate in accordance with the so-called Bluetooth™ technology (IEEE 802.15.1 standard), which technology is well known to persons skilled in the art and hence a detailed description thereof is omitted here.

Transmitter 2 and receiver 6 are adapted to enable intra-body communication in which power and data signal transmission and reception is based on (for instance, capacitive or ohmic) coupling of a displacement current into the body of user 3 and the use of the environment as the current return path.

Figure 2:
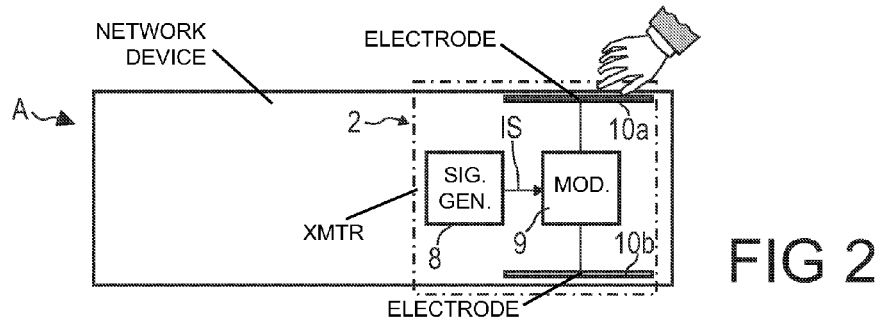
FIG. 2 shows details of a network device of FIG. 1.

FIG. 2 shows a detailed embodiment of the transmitter 2 shown in FIG. 1. The transmitter 2 comprises a signal generator 8 for generating said network initiation signal MIS and a modulator 9 coupled with the signal generator 8 for generating a modulated network initiation signal. A pair of electrodes constituting a capacitor is coupled to the modulator 9, of which pair a first electrode 10a and a second electrode 10b are shown. In this case, first electrode 10a is referred to as a transmitter electrode and adapted to couple with said body of the user 3 for submitting the modulated network initiation signal MIS. The signal generator 8 generates the network initiation signal and feeds it to the modulator 9 for Amplitude Shift Keying (ASK) modulation and, in such a manner, the modulated network initiation signal MIS is fed to the transmitter electrode. It may be mentioned that the transmission signal may be modulated in accordance with another modulation method, such as Frequency Shift Keying (FSK).

The receiver 6 (not shown in more detail, and also denoted as "touch interface" of the device B) comprises a receiver electrode, a demodulator and a signal detector. By touching both electrodes, for instance, with the right hand of the user 3 touching the transmitter electrode and his left hand touching the receiver electrode, the modulated network initiation signal MIS is conducted by the user's body from the transmitter 2 (also denoted as "touch interface" of the device A) to the receiver 6, i.e. from device A to device B. It may be mentioned that it is not important that touching both devices begins at the same point of time but there must be at least a point of time or a time interval at which both electrodes are touched essentially simultaneously.

The explicit signal path of the signals sent via intra-body communication extends from the transmitter electrode to the receiver electrode via the body of the user 3, and the return path extends via the ground the user 3 stands on. The receiver 6 should be capable of detecting, or measuring, relatively small currents. With respect to further explanations of such an intra-body communication and signal path, reference is made to the document U.S. Pat. No. 5,914,701 "Non-contact system for sensing and signalling by externally induced intra-body currents" and in particular to its FIG. 1 and the corresponding description thereof, the disclosure of which is herewith incorporated by reference.

It should be mentioned here that the electrodes, when coupling with said body of the user 3, might directly be contacted by the skin of the body of user 3. It should also be mentioned that such a direct contact with the skin is not necessarily required. Bearing this in mind, a great variety of possibilities with respect to placing the electrodes on or in a housing or cabinet of the devices A, B is apparent to a person skilled in the art.

Summarizing the embodiments of FIGS. 1 and 2, a network is established between a first wireless virtual connector enabled device A and a second wireless virtual connector enabled device B. The transmitters 2 and 6 can also be denoted as intra-body communication interfaces. The transmitter 2 is connected to the wireless communication interface 1 via a virtual connector 4. Similarly, the transmitter 6 is connected to a wireless communication interface 5 via a virtual connector 7.

For establishing a network between the devices A, B, a user 3 touches both devices A, B simultaneously. Subsequently, relevant data MIS for network set-up are exchanged through intra-body communication. Then, the virtual connectors 4, 7 wake up the radio communication interfaces 1, 5. After this, a wireless network is established between the two devices A, B wherein data exchange through this wireless network takes place by emitting and receiving electromagnetic waves by the communication interfaces 1, 5.

Each device A, B is provided with an element 2, 6 providing intra-body communication functionality IBC. The transmitters 2, 6 may periodically emit an activation code, for instance, each second. This may be done independently of (i.e. non-synchronized with) the other devices. The different devices A, B may also use different intervals. In a scenario in which a user 3 touches both devices A, B simultaneously, the activation code MIS is transmitted from one of the transmitters 2, 6 to the other one and is received by the other one. The assignment of the emitter and receiver functionality to the transmitters 2 and 6 is arbitrary, depending on which of the two simultaneously touched devices A, B emits the activation code first. After having emitted the activation code, the receiving device emits a receiving confirmation, via intra-body communication. Then, the emitting device sends, via intra-body communication, the required configuration data for the wireless network to the receiver device.

For particular wireless network configurations, the role of the different devices within the network may be important, for instance, Bluetooth master device, slave device, etc. Dependent on which device becomes the receiver device of the activation code, particular requirements for establishing the wireless network may have to be considered.

Figure 3:
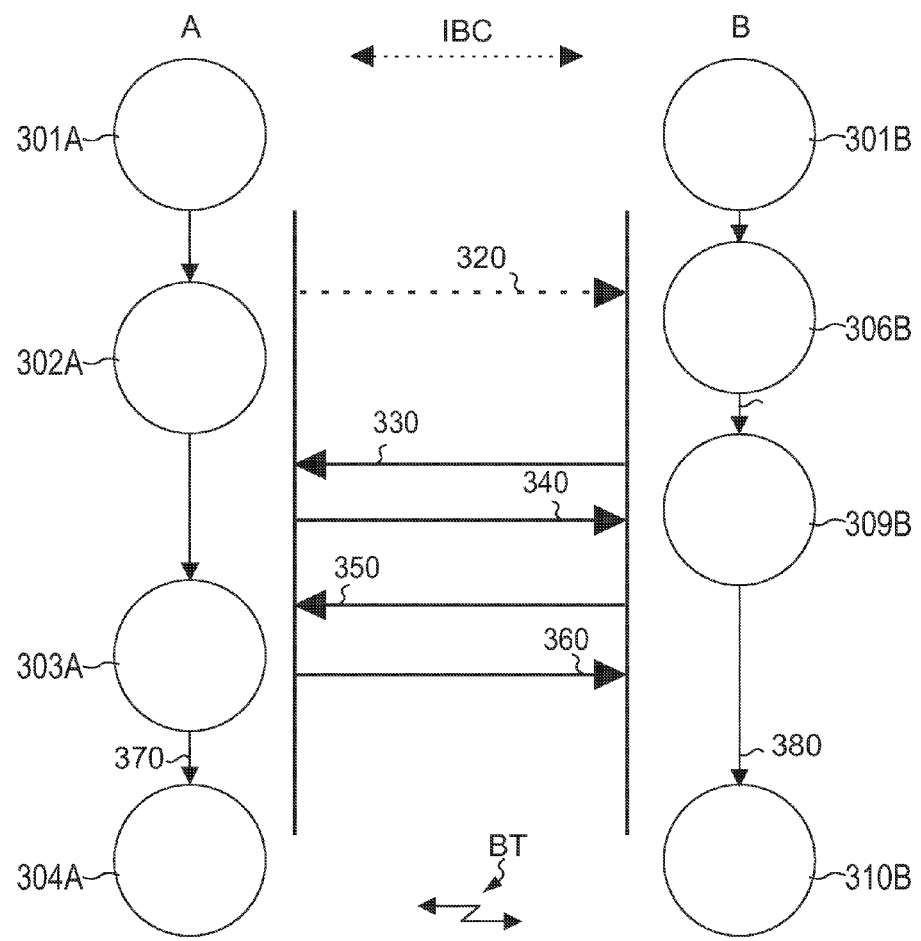
FIG. 3 is a schematic state diagram and a corresponding communication message diagram illustrating different communication states run through by the network devices based on Bluetooth wireless technology according to the embodiment shown in FIG. 1.

FIG. 3 is a schematic state diagram illustrating different communication states run through by the network devices according to the embodiment shown in FIG. 1. In particular, FIG. 3 shows the state diagram for initially setting up a wireless Bluetooth network between devices A and B.

In a first stage, according to a state 301A, device A is in a Bluetooth BT disconnected state. Likewise, device B is in the Bluetooth BT disconnected state as indicated according to a state 301B. In a further stage, it is assumed that user 3 establishes an intra-body communication IBC (depicted as a dashed arrow) between devices A and B as described in the previous sections. In fact, the user 3 is given the possibility of choice in a simple and intuitive way just by touching the devices and hence indicating which device shall form an ad-hoc network. Such a possibility is particularly advantageous in view of securely building up a network, wherein securely in this context means that only certain devices are allowed to build up the network, namely those that are touched.

In a subsequent second stage, according to a state 302A, device A is set to the Bluetooth BT page-scan state by means of a wake-up signal WU1 generated by controller 4. According to a state 306B, device B is waiting for an incoming connection request 320 through intra-body communication IBC.

Subsequent to the second stage, say, in a third stage, according to a state 303A, device A sends a connection request through IBC in that transmitter 2 transmits a network initiation signal MIS to receiver 6 via the body of user 3. In the present case, the network initiation signal MIS comprises the Bluetooth address of the device A, i.e. a 48-bit MAC-address stored in a memory (not shown) of device A. As soon as the receiver 6 receives or is receiving said connection request 320, device B enters the Bluetooth BT page-state according to a state 309B. In said page-state, controller 7 generates the wake-up signal WU2. In other words, wake-up signal WU2 is generated on the basis of the initiation signal MIS sent by the device A through intra-body communication IBC. User 3 may cease touching the electrodes, or break the intra-body communication IBC as soon as state 309B is entered. In the present case, the time duration in which the intra-body communication IBC has to be maintained lasts about 0.5 second only.

The wake-up signal WU2 wakes up the second wireless communicator 5, after which wake-up the second wireless communicator 5 transmits a page request signal 330 to device A identified by its Bluetooth address. Now, after having received the page request 330 sent by device B, device A is able to send a page response signal 340 via the first wireless communicator 1. In a further communication step, device B sends a connection request signal 350 via the second wireless communicator 5, which connection request signal 350 will be received by device A through first wireless communicator 1. In a further communication step, said connection request signal 350 received by device A will be acknowledged by a connection accept signal 360 sent to device B via first wireless communicator 1. After having received the connection accept signal 360, device B enters a Bluetooth BT connected-master state according to a state 310B of FIG. 3. By having transmitted the connection accept signal 360 via first wireless communicator 1, a wireless Bluetooth BT connection between device A and device B is established, hence device A has entered the Bluetooth BT connected-slave state according to a state 304A shown in FIG. 3. Reference numeral 370 denotes a state in which a Bluetooth page and connect request is received. Reference numeral 380 denotes a state in which a Bluetooth page and connect request are accepted.

The connection request 320 sent through intra-body communication IBC contains the Bluetooth address of device A. By knowing the Bluetooth address of the device A, the device B can immediately page the device A and then connect to the device A without requiring an inquiry procedure.

A further embodiment according to the invention will now be described with reference to FIGS. 4, 5, 6A and 6B.

Figure 5:
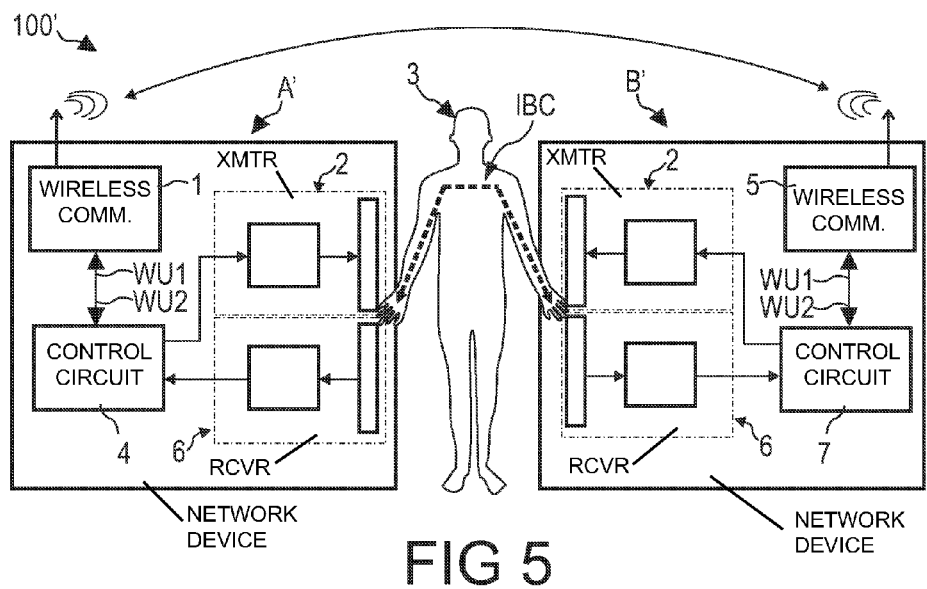
FIG. 5 shows a network system comprising network devices according to a further embodiment of the invention.

FIG. 5 shows a network system 100' which comprises a first network device A' and a second network device B'. For the sake of simplicity, these network devices will be referred to as device A' and device B', respectively. Device A' deviates from device A of FIG. 1 in that a receiver 6 is provided and embodied in addition to the transmitter 2 of device A. Similarly, device B' deviates from device B of FIG. 1 in that a transmitter 2 is provided and embodied in addition to the receiver 6 of device B. In other words, device A' and device B' may be seen as identical network devices comprising, inter alia, a transceiver for intra-body communication, which transceiver consists of the transmitter 2 and the receiver 6.

In the present case, transmitter 2 is adapted to generate the initiation signal MIS in time intervals which are defined and provided by a timer (not shown) of the respective devices A' and B'. As each transmitter 2 of the devices A' and B' now generates the initiation signal MIS, a collision on the intra-body communication IBC channel may occur when established by the user 3. In order to avoid such a collision, the time intervals consist of a fixed time component and a random time component. This prevents a collision of an initiation signal sent from transmitter 2 of device A' and an initiation signal sent from transmitter 2 of device B' in that a small deviation of the transmission start time of the respective transmitter 2 of the devices A' and B' is given. In other words, either transmitter 2 of the device A' or transmitter 2 of the device B' sends its respective initiation signal first. Device A' or B' will stop its respective timer as soon as the receiver 6 receives or has received the initiation signal MIS.

In the present case, the transmitter and receiver electrodes are arranged in such a way that they spatially and directly adjoin but are insulated from each other. It should be mentioned that a common electrode might be used both as a transmitter electrode and as a receiver electrode; in this case, a switching circuit is provided and adapted to switch the common electrode either to the receiving part or to the transmitting part of the transceiver.

It is now to be assumed that device A' and device B' have already entered a Bluetooth BT connection as described above with reference to FIG. 3. A situation may occur in which a new device C' may enter or join the existing wireless network between devices A' and B'. Such a situation is depicted in FIG. 4.

Figure 4:
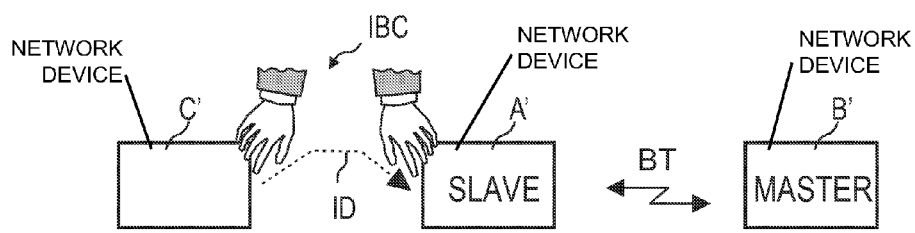
FIG. 4 shows a new device joining an existing wireless network between two devices based on a master-slave concept.
Figure 6A:
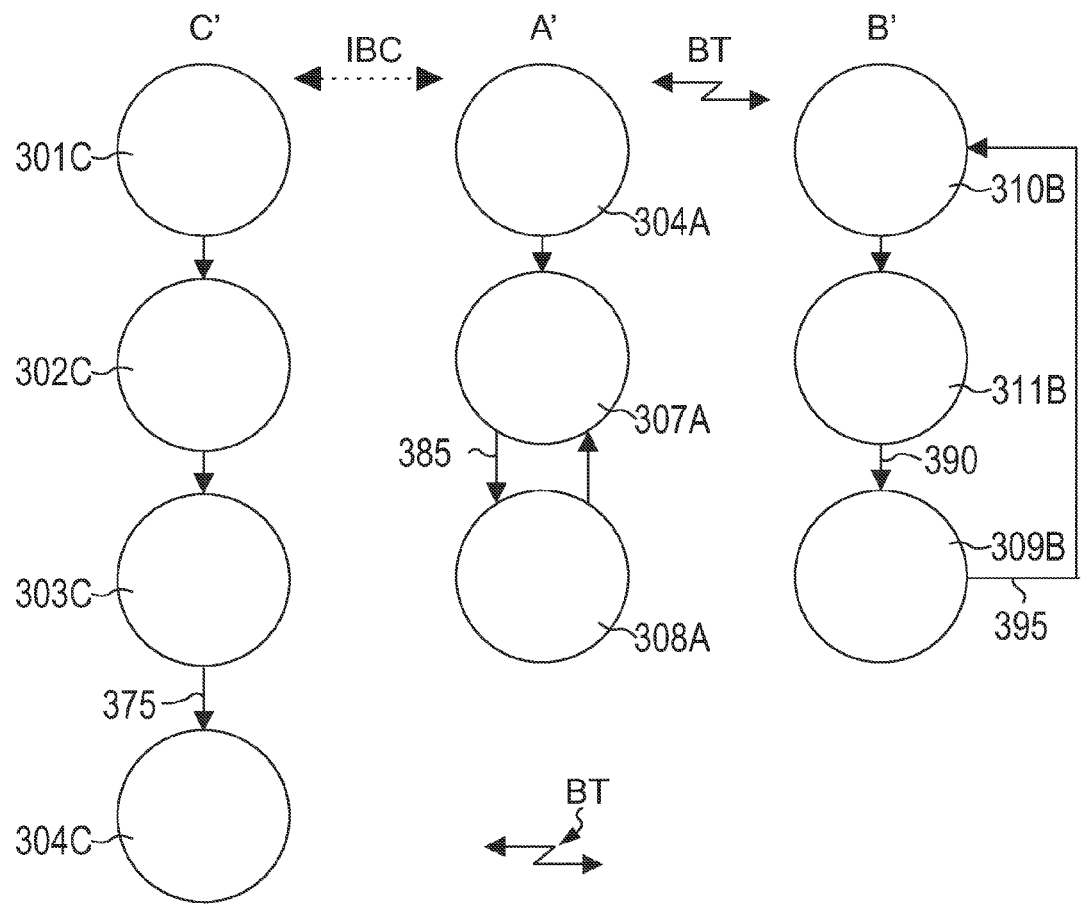
FIGS. 6A and 6B are communication state diagrams in the situation shown in FIG. 4.
Figure 6B:
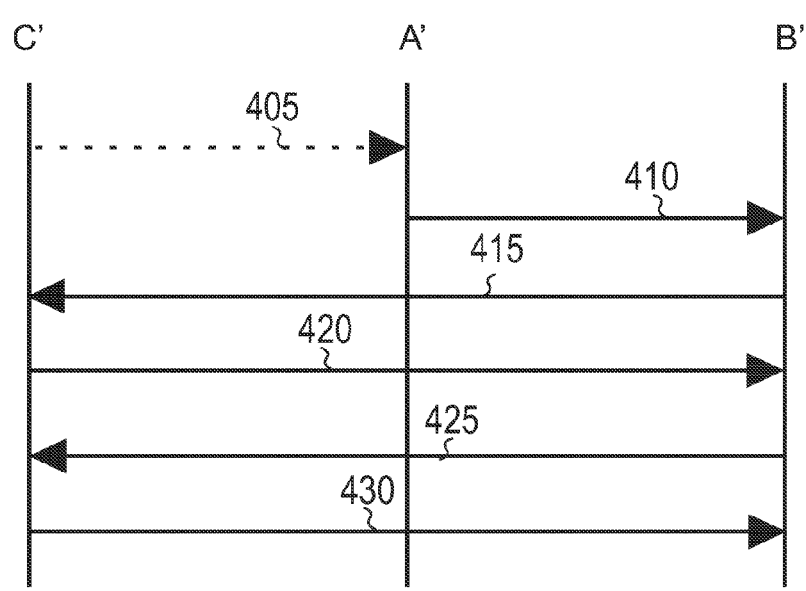

FIG. 6A shows in particular a state diagram for extending an existing master-slave wireless Bluetooth network, which extension is realized by touching the new device C' and the slave device A', as is shown in FIG. 4. FIG. 6B shows a corresponding message diagram.

In a first stage, according to a state 301C, device C' is in a Bluetooth BT disconnected state and device A' is in the Bluetooth BT connected-slave state as indicated according to a state 304A, and device B' is in the Bluetooth BT connected-master state as indicated by a state 310B. Now, it is assumed that user 3 establishes an intra-body communication IBC between devices C' and A' as described in the previous sections.

In a subsequent second stage, according to a state 302C, controller 4 generates a wake-up signal WU1 to set device C' into the Bluetooth BT page-scan state. Furthermore, according to a state 307A, device A' is waiting for an incoming connection request through intra-body communication IBC, and device B', according to a state 311B, is waiting for an incoming connection request through the Bluetooth BT connection of device A'.

In a subsequent third stage, according to a state 303C, device C' sends a connection request 405 through IBC in that transmitter 2 of device C' transmits a network initiation signal MIS via the body of user 3 to device A'. In the present case, the network initiation signal comprises the Bluetooth BT address of the device C', i.e. a 48-bit MAC-address stored in a memory (not shown) of device C'. As soon as the receiver 6 of device A' receives or is receiving said connection request 405, device A' enters a state 308A, according to which state 308A device A' forwards 410 the connection request 405 received from device C' to device B' via the wireless communicator of device A'. Device A', having forwarded said connection request 405, again enters state 307A waiting for an incoming connection request through intra-body communication IBC. After having received the connection request 405 of device C' forwarded 410 by device A' via the Bluetooth BT connection, device B' enters a state 309B in which a page request signal 415 is sent to device C' via the wireless communicator of device B', which device C' is identified by its Bluetooth address. Now, after having received the page request 415 sent by device B', device C' is able to send a page response signal 420 via the wireless communicator of device C'. In a further communication step, device B' sends a connection request signal 425 via the second wireless communicator 5, which connection request signal 425 will be received by device C' through the wireless communicator of device C'. In a further communication step, said connection request signal 425 received by device C' will be acknowledged by a connection accept signal 430 sent to device B' via the wireless communicator of device C'. Device C' has thereby joined the existing Bluetooth network of devices A' and B'. After having received the connection accept signal 430, device B' again enters state 310B which is the Bluetooth BT connected-master state.

Reference numeral 375 denotes a state in which a Bluetooth page and connect request is received. Reference numeral 385 denotes a state in which an intra-body communication connection request is received. Reference numeral 390 denotes a state in which a connection request is received through intra-body communication. Reference numeral 395 denotes a state in which a Bluetooth page and connect request is accepted.

Figure 7A:
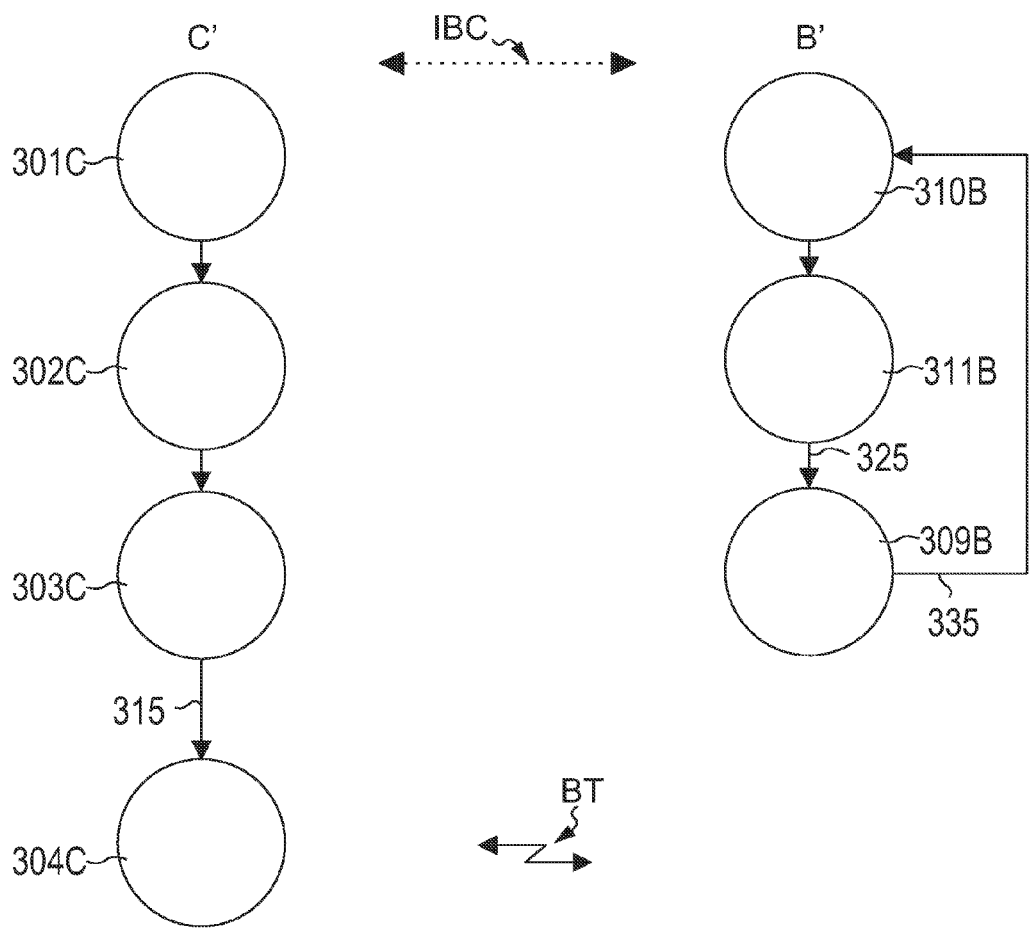
FIGS. 7A and 7B are state diagrams for extending an existing master-slave wireless network involving the master device.
Figure 7B:
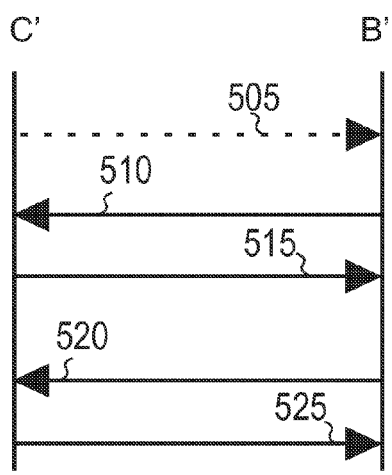

FIGS. 7A and 7B show in particular a state diagram for extending an existing master-slave wireless Bluetooth network, which extension is realized by touching a new device C' and the master device B'. FIG. 7 also shows a corresponding message diagram.

In a first stage, according to a state 301C, device C' is in a Bluetooth BT disconnected state and device B' is in the Bluetooth BT connected-master state as indicated by a state 310B. Now, it is again assumed that user 3 establishes an intra-body communication IBC between devices C' and B' as described in the previous sections.

In a subsequent second stage, according to a state 302C, controller 4 of device C' generates a wake-up signal WU1 to set device C' into the Bluetooth BT page-scan state. Furthermore, according to state 311B, device B' is waiting for an incoming connection request 505 through intra-body communication IBC of device C'.

In a subsequent third stage, according to a state 303C, device C' sends a connection request 505 through IBC in that transmitter 2 of device C' transmits a network initiation signal MIS to device B' via the body of user 3. In the present case, the network initiation signal comprises the Bluetooth BT address of the device C', i.e. a 48-bit MAC-address stored in a memory (not shown) of device C'. As soon as the receiver 6 of device B' receives or is receiving said connection request 505, device B' enters a state 309B, according to which state 309B a page request signal 510 is sent via the wireless communicator of device B' to device C' identified by its Bluetooth address. Now, after having received the page request 510 sent by device B', device C' is able to send a page response signal 515 to device B' via the wireless communicator of device C'. In a further communication step, device B' sends a connection request signal 520 via its wireless communicator, which connection request signal 520 will be received by device C' through the wireless communicator of device C'. In yet another communication step, said connection request signal 520 received by device C' will be acknowledged by a connection accept signal 525 sent to device B' via the wireless communicator of device C'. Device C' has thereby joined the existing Bluetooth network with device B' as master. After having received the connection accept signal 525, device B' again enters state 310B, which is the Bluetooth BT connected-master state.

Reference numeral 315 denotes a state in which a Bluetooth page and connect request is received. Reference numeral 325 denotes a state in which an intra-body communication connection request is received. Reference numeral 335 denotes a state in which a Bluetooth page and connect request is accepted.

Figure 8:
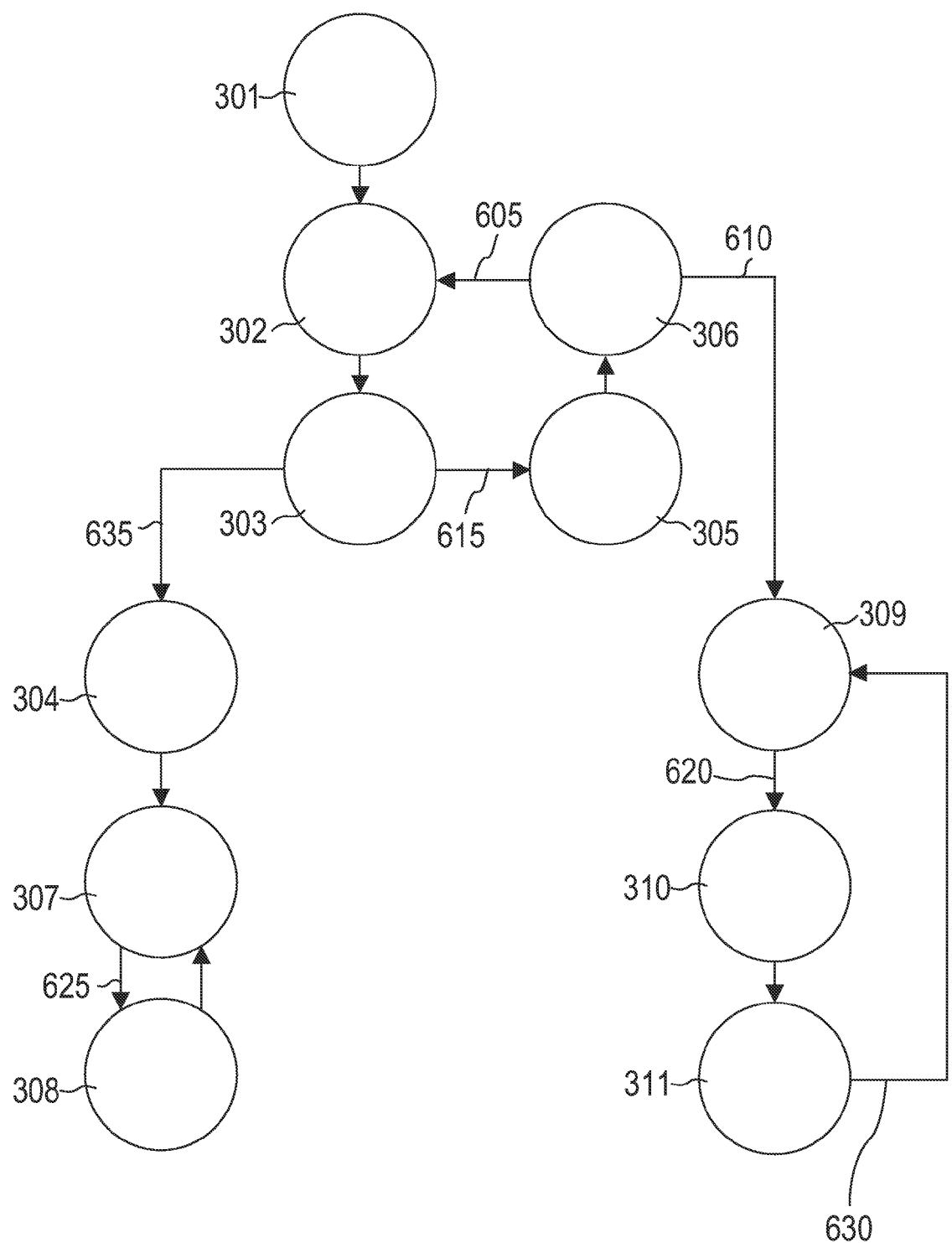
FIG. 8 shows the overall state machine in accordance with the cases shown in FIGS. 3, 6A, 6B, 7A and 7B.

FIG. 8 shows an overall state diagram of states which each device according to FIG. 5 may reach or go through, depending on the specific network situation shown in FIGS. 3, 6 and 7.

Initially, when switching on such a device, a disconnected state is considered as the starting point as depicted by a state 301 in FIG. 8. Subsequently, according to a state 302, the device switches to the Bluetooth BT page-scan state. Then a state 303 is entered, according to which state 303 a connection request is sent through intra-body communication IBC, and a first timer is started, whose time comprises a fixed time component and a random time component. After a timeout 615 of the first timer, a state 305 is entered, which state 305 is the Bluetooth BT disconnected state wherein the page scan mode is stopped. Then, a state 306 is entered immediately, according to which state 306 an incoming connection request through intra-body communication IBC is awaited and a second timer is started, whose time comprises a fixed time component and a random time component. After the timeout 605 of the second timer, state 302 is entered again and the process described starts again.

If, in state 302, a page request and a connection request through Bluetooth BT communication have been received, a state 304 is entered, according to which state 304 the Bluetooth BT connected-slave state is entered. Then, after having entered the Bluetooth BT connected-slave state, a state 307 is entered, according to which state 307 an incoming connection request through intra-body communication IBC is awaited. If a connection request through intra-body communication IBC is received, a state 308 is entered. According to state 308, the connection request received through intra-body communication IBC is sent or forwarded to the Bluetooth BT connected-master device through Bluetooth BT communication and state 307 is entered again.

If, in state 306, a connection request containing the Bluetooth address of another device through intra-body communication IBC is received, a state 309 is entered, or else, if a timeout of the second timer appears before the connection request is received, state 302 is entered again. According to state 309, a Bluetooth BT page-state is entered in which a page request is sent to the device identified by its Bluetooth address and a subsequent connection request is submitted through Bluetooth BT communication, in which an accept message in response to the page request and connection request sent through Bluetooth BT communication is awaited. When the accept message is received, a state 310 is entered, which is the Bluetooth BT connected-master state. Then, after having entered the Bluetooth BT connected-master state, a state 311 is entered immediately, according to which state 311 an incoming connection request through intra-body communication IBC or Bluetooth BT communication is awaited. In other words, according to state 311, the device is ready for incorporating a further device, adapted according to the invention, into the existing network. If a connection request through intra-body communication IBC or Bluetooth BT communication is received in state 311, state 309 is entered again.

Reference numeral 635 denotes a state in which a Bluetooth page and connect request is received. Reference numeral 625 denotes a state in which an intra-body communication connection request is received. Reference numeral 620 denotes a state in which a Bluetooth page and connect request is accepted. Reference numeral 630 denotes a state in which a connection request is received through intra-body communication or Bluetooth (forwarded by slave).

A further embodiment of the invention will now be described with reference to FIGS. 9, 10A, 10B and 11.

In such an embodiment, a low-rate WPAN (wireless personal area network) and network devices as described with reference to FIG. 5 are assumed to be used, with the main difference that the wireless communicator of a respective device is adapted to communicate in accordance with the technology standard IEEE 802.15.4. However, the embodiment is also applicable to wireless LANs based on IEEE 802.11. The devices involved will hereinafter be referred to as device A' and device B', respectively.

Figure 9:
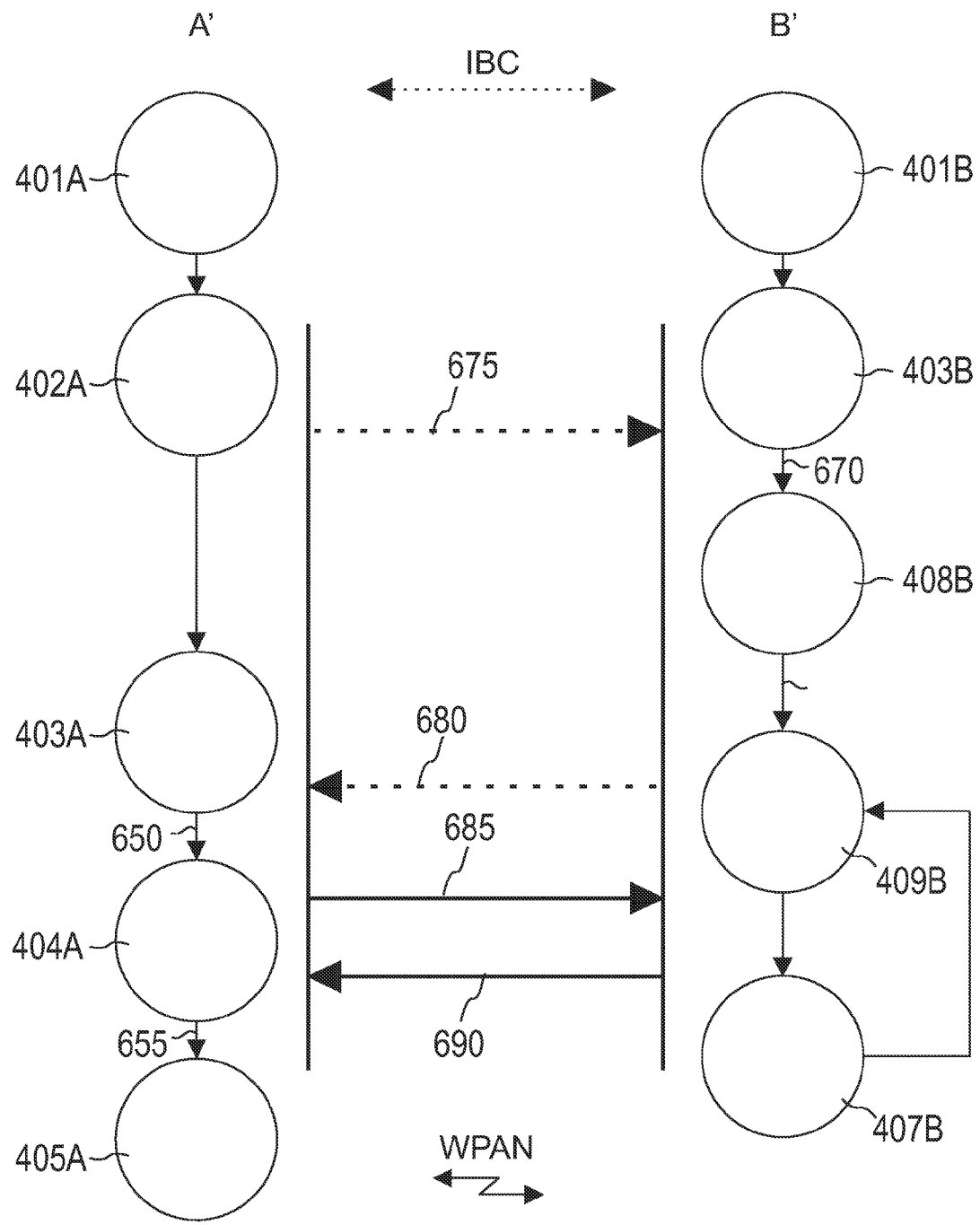
FIG. 9 is a state diagram illustrating different states run through by network devices according to the invention, based on IEEE 802.15.4 WPAN or 802.11 WLAN technologies.

A state diagram for initially setting up the IEEE 802.15.4-based WPAN will now be explained with reference to FIG. 9.

In a first stage, according to a state 401A, device A' is in a WPAN disconnected state and device B' is in a WPAN disconnected state as indicated by a state 401B. Now, it is assumed that user 3 establishes an intra-body communication IBC between devices A' and B' as described in the previous sections.

In a subsequent second stage, according to a state 402A, transmitter 2 of device A' transmits a network initiation signal MIS to device B' via the body of user 3. Furthermore, according to state 403B, device B' is waiting for an incoming connection request 675 through intra-body communication IBC of device A'.

In a subsequent third stage, according to a state 408B, after having received the connection request 675 through intra-body communication IBC of device A', device B' initiates a start of a new WPAN with a unique network identifier and takes the part of a WPAN-coordinator according to a state 409B. Then, according to a state 407B, transmitter 2 of device B' sends a "connection-accept" message 680 containing the network identifier of the network to be established through intra-body communication IBC to device A' and enters state 409A again. After having sent the connection request 675 through intra-body communication IBC, device A' is waiting for a connection-accept message 680 through intra-body communication IBC according to a state 403A. Having received the connection-accept message 680 containing the network identifier through intra-body communication IBC, according to a state 404A, device A' initiates an association process to the new WPAN identified by its network identifier in that an associate request 685 is sent through WPAN communication. The associate request 685 of device A' is received by device B' and is acknowledged by device B' with an associate response message 690. When it has received the associate response message 690 via WPAN communication, device A' joins the WPAN network and enters a WPAN connected state according to a state 405A.

Reference numeral 650 denotes a state in which an intra-body communication connection-accept message is received. Reference numeral 655 denotes a state in which a MLME-ASSOCIATE (MAC layer management entity) confirmation is received. Reference numeral 670 denotes a state in which an intra-body communication connection request is received. Reference numeral 665 denotes a state in which a MLME-START (MAC layer management entity) confirmation is received.

Figure 10B:
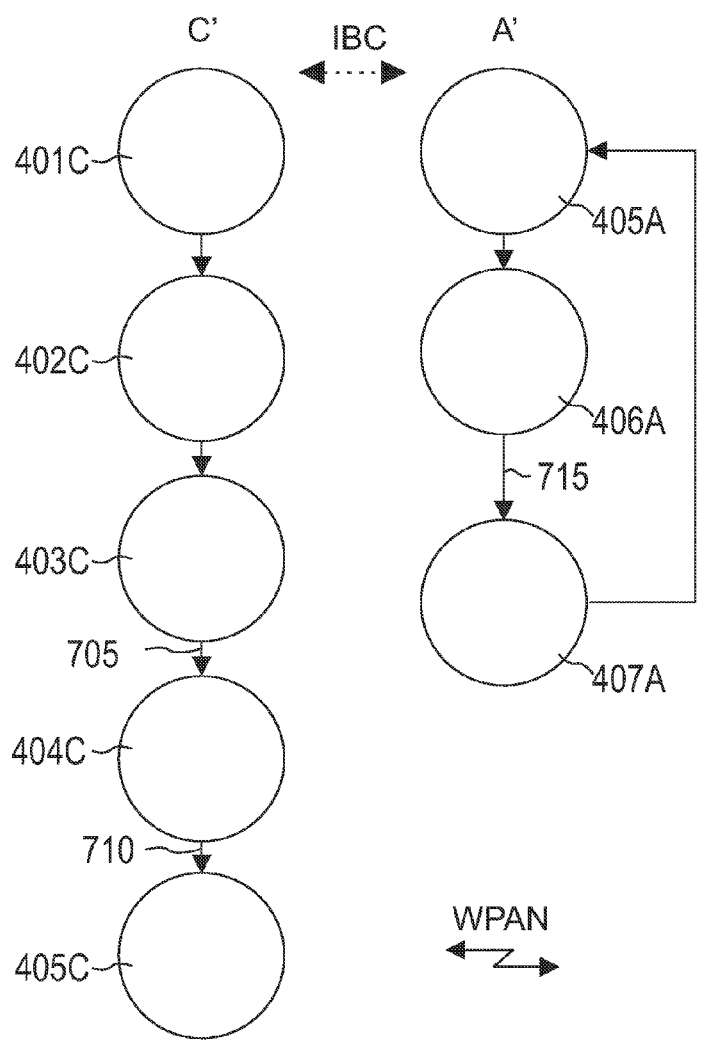
Figure 10B:
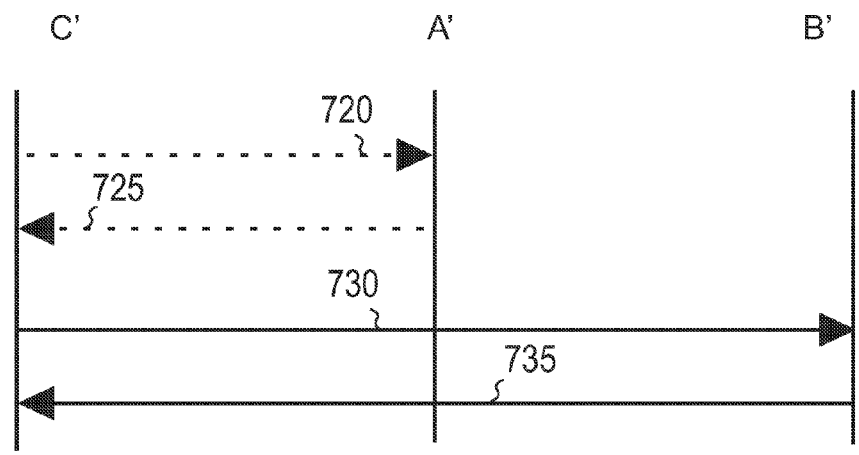

The situation of extending the IEEE 802.15.4-based WPAN will now be explained with reference to FIGS. 10A and 10B. In the WPAN, it is to be assumed that device A' is associated to coordinator device B'. A new device C' is going to be connected to the WPAN in that devices C' and A' are touched.

In a first stage, according to a state 401C, device C' is in a WPAN disconnected state and device A' is in a WPAN connected state as indicated by a state 405A. Now, it is assumed that user 3 establishes an intra-body communication IBC between devices C' and A' as described in the previous sections.

In a subsequent second stage, according to a state 402C, transmitter 2 of device C' transmits a network initiation signal MIS to device A' via the body of user 3. Furthermore, according to state 406A, device A' is waiting for an incoming connection request through intra-body communication IBC of device C'.

In a subsequent third stage, according to a state 407A, after having received the connection request through intra-body communication IBC of device C', device A' sends a connection-accept message containing the network identifier of the WPAN network to device C' through intra-body communication IBC and enters state 405A again. After having sent the connection request 720 through intra-body communication IBC, device C' is waiting for a connection-accept message 725 through intra-body communication IBC according to a state 403C. Having received the connection-accept message 725 containing the network identifier through intra-body communication IBC, according to a state 404C, device C' initiates an association process to the new WPAN identified by the network identifier in that an associate request 730 is sent to coordinator device B' through WPAN communication. The associate request 730 of device C' is received by device B' and is acknowledged with an associate response 735. Having received the associate response 735 via WPAN communication, device C' joins the WPAN network and enters a WPAN connected state according to a state 405C.

Reference numeral 705 denotes a state in which an intra-body communication connection-accept message is received. Reference numeral 710 denotes a state in which a MLME-ASSOCIATE (MAC layer management entity) confirmation is received. Reference numeral 715 denotes a state in which an intra-body communication connection request is received.

Figure 11:
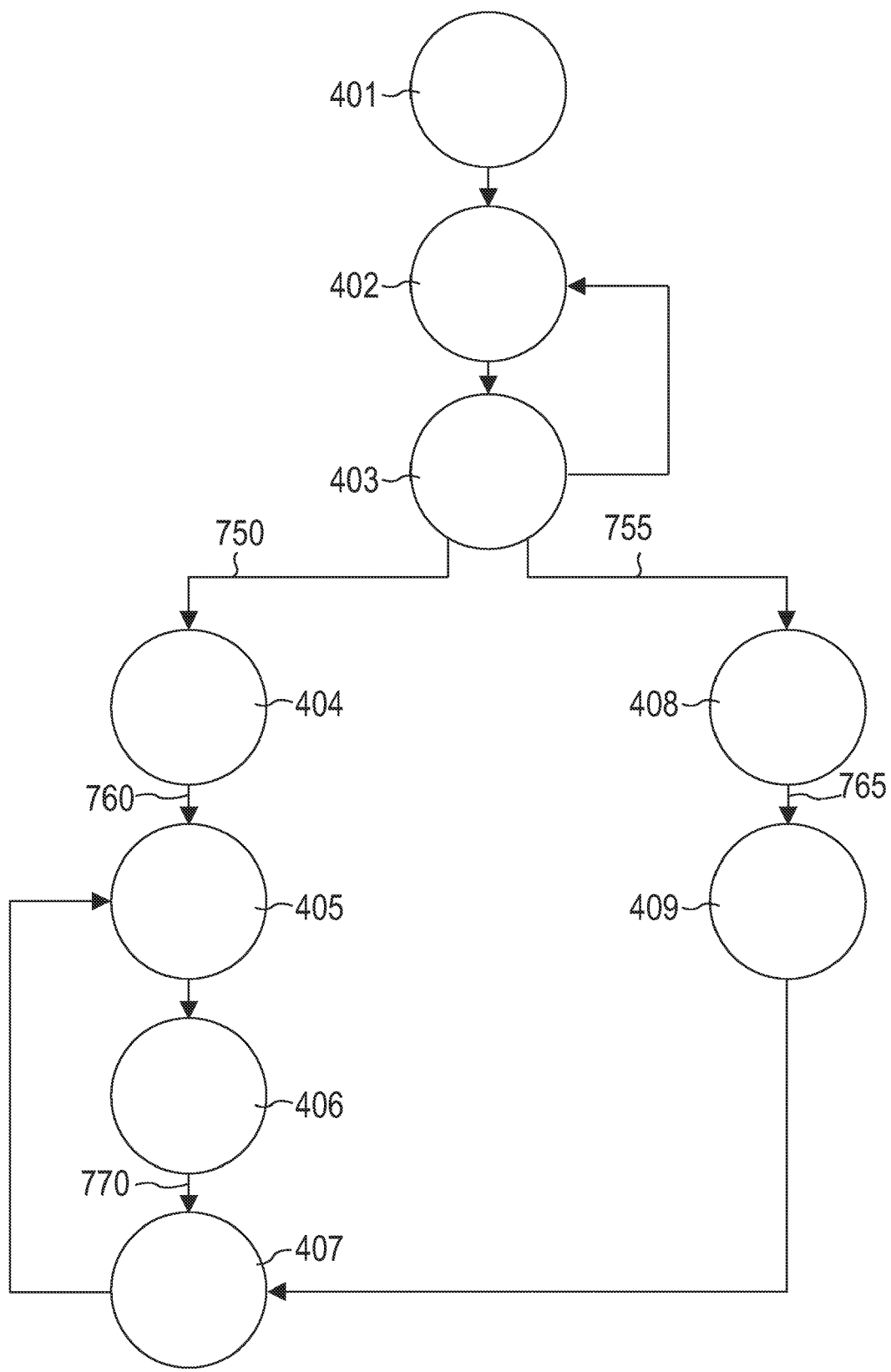
FIG. 11 shows the overall state machine in accordance with the cases shown in FIGS. 9, 10A and 10B.

An overall state diagram of the 802.15.4-based WPAN case will now be described with reference to FIG. 11.

A WPAN enabled device starts with a WPAN disconnected state according to a state 401.

In a subsequent second stage, according to a state 402, a "connection-request" message is going to be sent via intra-body communication IBC. Then, according to a state 403, a "connection-accept" message or connection-request message through intra-body communication IBC is awaited and a first timer is started, whose time setting comprises a fixed time component and a random time component. In the case of a timeout of the first timer, state 402 is entered again for sending the connection-request message via intra-body communication IBC.

If a connection-accept message containing the network identifier is received in state 403, an association process to the WPAN identified by its network identifier is initiated according to state 404 and a MLME-ASSOCIATE is sent through WPAN communication.

If a connection-request message is received in state 403, a start of a new WPAN with a unique network identifier is initiated according to a state 408 and an MLME-START is sent via WPAN communication. If a confirmation of the MLME-START is received in state 408, the WPAN connected coordinator state is entered according to a state 409. Thereafter, according to a state 407, a connection-accept message containing the network identifier is sent through intra-body communication IBC.

If a confirmation of the MLME-ASSOCIATE is received via WPAN in state 404, the WPAN connected state is entered according to a state 405, whereupon an incoming connection-request message is awaited according to a state 406. If a connection-request message is received in state 406 through intra-body communication IBC, state 407 is entered for sending a connection-accept message through intra-body communication IBC.

Reference numeral 750 denotes a state in which an intra-body communication connection-accept message is received. Reference numeral 760 denotes a state in which a MLME-ASSOCIATE (MAC layer management entity) confirmation is received. Reference numeral 755 denotes a state in which an intra-body communication connection request is received. Reference numeral 765 denotes a state in which a MLME-START (MAC layer management entity) confirmation is received.

A further embodiment according to the invention will now be explained with reference to FIGS. 12A to 12E.

Figure 12A:
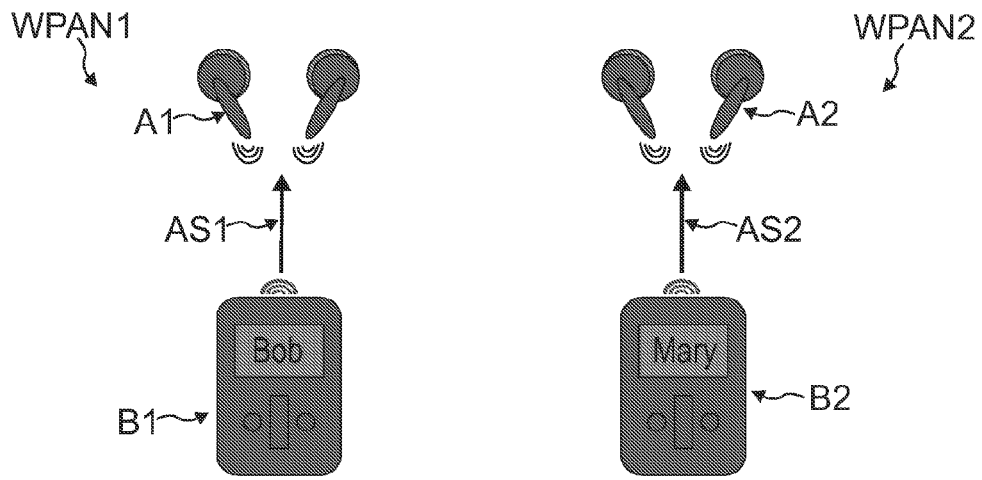
FIGS. 12A to 12E show set-ups of a wireless network for a shared music listening experience between users, based on network devices according to the invention.

FIG. 12A shows a first and a second wireless personal area network WPAN1 and WPAN2, further referred to as WPAN1 and WPAN2, respectively. In the present case, WPAN1 and WPAN2 are based on the technology standard IEEE 802.15.1 (Bluetooth™ BT).

WPAN1 is being used by user "Bob" and comprises a first network device A1 and a second network device B1, which are further referred to as device A1 and device B1, respectively. In the present case, device B1 is designed as a portable audio player and adapted for wireless streaming of first audio content AS1. Device A1 is designed as an ear-plug and adapted to receive wirelessly streamed first audio content AS1.

WPAN2 is being used by user "Mary" and comprises a third network device A2 and a fourth network device B2, which are further referred to as device A2 and device B2, respectively. In the present case, device B2 is constructed as a portable audio player and adapted for wireless streaming of second audio content AS2. Device A2 is constructed as an earplug and adapted to receive wirelessly streamed second audio content AS2.

Figure 12B:
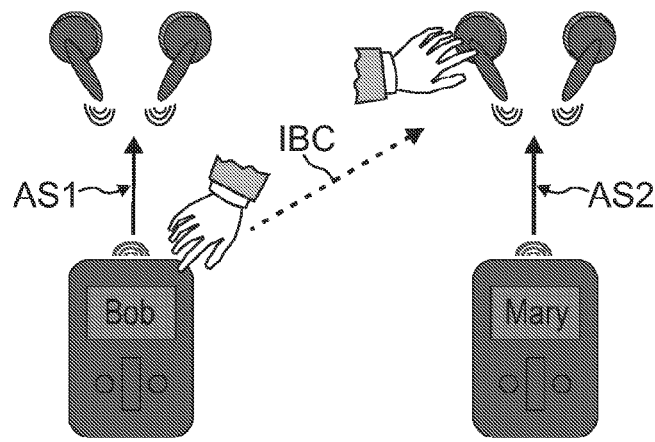
Figure 12C:
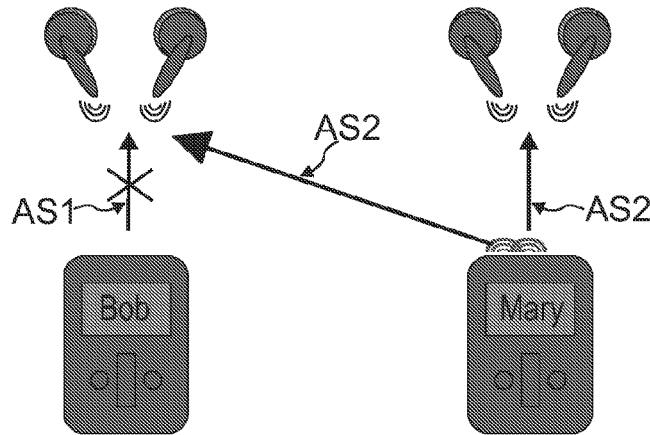

FIG. 12B shows that, in the present case, user Bob is going to touch devices B1 and A2, indicating in a simple and intuitive manner that he wants to listen to audio content and to the wirelessly streamed second audio content AS2 of device B2 used and listened to by user Mary. In other words, Bob wants to listen to the audio content Mary is listening to. By touching the devices B1 and A2, device B1 stops streaming the wirelessly streamed first audio content AS1 to device A1, as device A1 is now receiving the wirelessly streamed second audio content AS2. Such a situation is depicted in FIG. 12C.

Figure 12D:
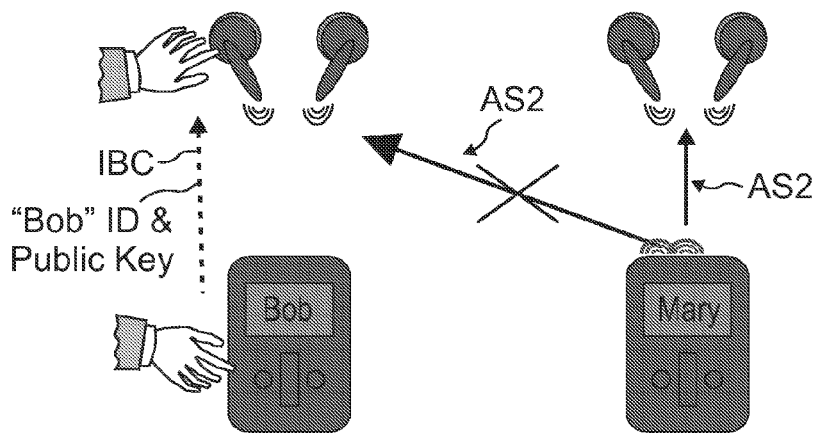
Figure 12E:
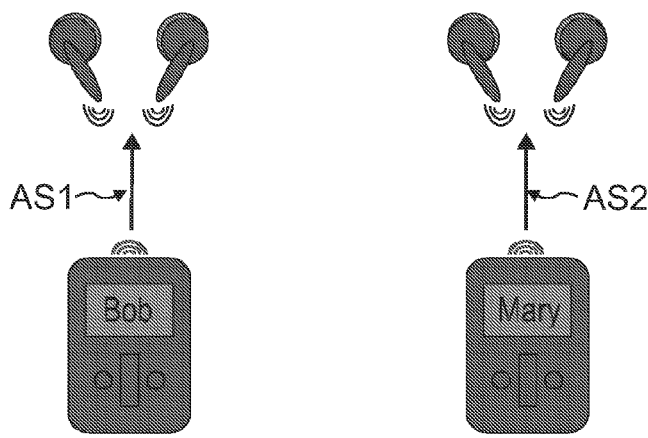

In FIG. 12D, it is assumed that user Bob wants to listen again to his "own" audio content of device B1. By Bob simply touching devices A1 and B1, device B2 stops streaming the wirelessly streamed second audio content AS2 to device A1, as device A1 is now again receiving the wirelessly streamed first audio content AS1. Such a situation is depicted in FIG. 12E.

Figure 13:
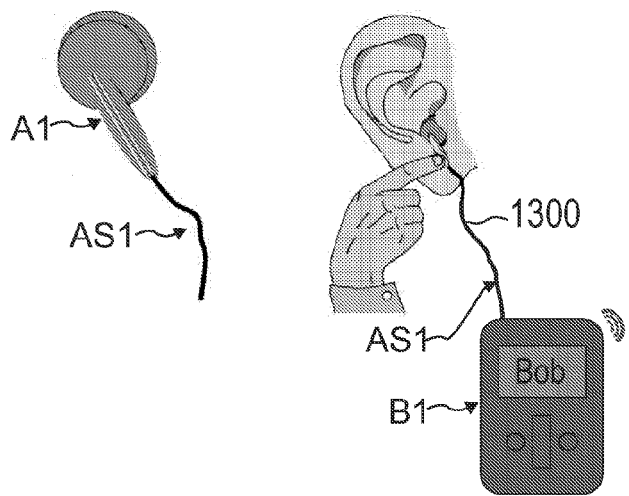
FIG. 13 shows a network system for a shared music listening experience according to a further embodiment of the invention.

FIG. 13 shows a further embodiment according to the invention. According to this embodiment, the device A1 communicates with the device B1 in a wired manner, i.e. via a cable connection 1300. However, the device B2 has the functionality to communicate with device A2 (not shown in FIG. 13) in a wireless manner. Apart from this difference, the situation according to the embodiment of FIG. 13 is similar to that shown in FIGS. 12A to 12E.

It should be noted that video content (i.e. audiovisual content) or pure visual content might be streamed in addition to or instead of streaming audio content. The video content may be streamed to eyeglasses and the same sharing method as described in FIGS. 12A to 12E may be adapted for the video streaming.

It should further be noted that a device according to the invention may be worn on a user's body, such that there is a permanent coupling between the body and the electrodes of the transceiver for intra-body communication. Just one further device has to be touched for establishing the intra-body communication IBC.

According to another embodiment of the invention, wireless headphones may be connected to a portable player via some form of Wireless Personal Area Network (WPAN) or Bluetooth network. WPANs can be set up via a data transfer through the human body via intra-body communication. This principle can be used to transfer commands and network identifiers, in order to set up, for instance, a connection between two portable media players. This intra-body communication IBC (via capacitance, magnetic induction, or other techniques) may be implemented for the purpose of setting up a shared music listening experience.

The user action described with reference to FIGS. 12A to 12E can be denoted as a "pull" action: User Bob touches headphone A2 to "pull" the music out of the headphone A2 to be played back also via the first headphone A1. It is alternatively possible to implement this action as a "push" action: When user Bob touches the headphone A2, he "pushes" the music played back via the headphone A1 also into the headphone A2.

The described aspects according to the invention can also be applied to personal data classes (head-mounted displays), to share viewing photos or movies together. A touch to another person's glasses would set off the shared connection, touching the own head-mounted display would break it again.

Thus, the invention can be applied to portable media players (wireless), headphones, personal data classes, head-mounted displays, hands-free kits, mobile phones, etc.

A music-sharing system in which music can be shared between two users each having an audio player and an associated wireless headphone, also referred to as headset, will now be described with reference to FIGS. 14 to 16. This process will be described with reference to these Figures for a WPAN type network ("slave-centric"). For the purpose of illustration, the nomenclature of FIGS. 12A to 12E is used, i.e. a first headphone is denoted as A1, a first audio player adapted for wireless communication with a first headphone A1 is denoted as B1, a second headphone is denoted as A2 and a second audio player adapted for wireless communication with the second headphone A2 is denoted as B2.

Figure 14:
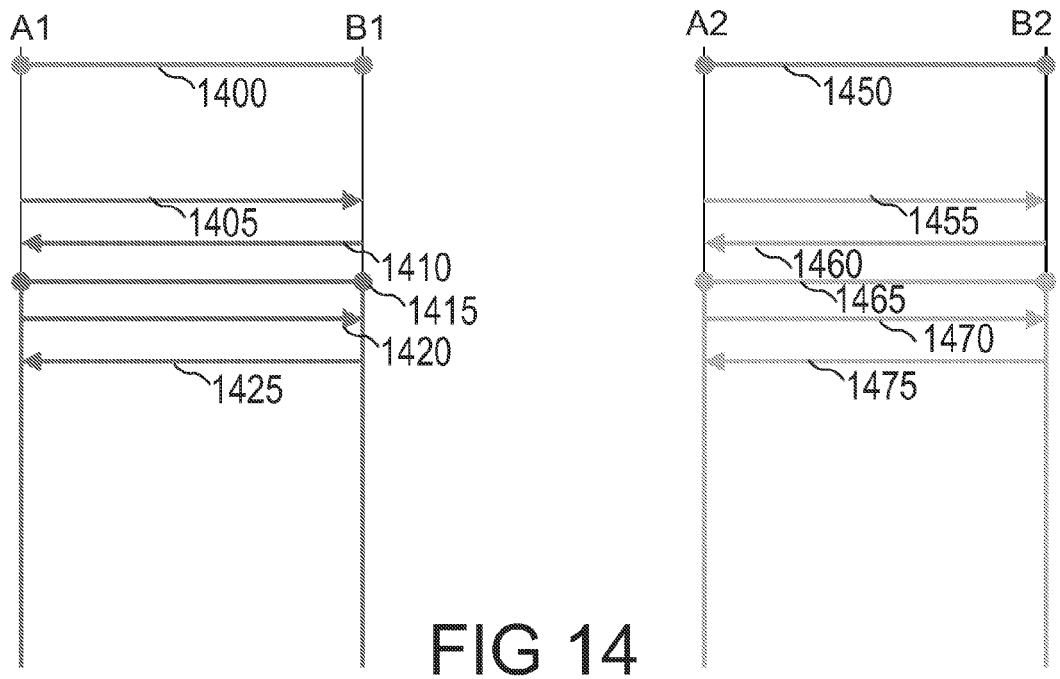
FIG. 14 is a schematic diagram illustrating a system of two audio players and two wireless headphones being operated in two separate WPAN networks.

FIG. 14 shows an operation state in which each pair A1, B1 and A2, B2 is operated in a separate network, i.e. A1 and B1 communicate via a first WPAN network, and A2 and B2 communicate via a second WPAN network.

To be operated in the first WPAN network, the first user Bob simultaneously touches the first headphone A1 and the first audio player B1 and thus enables an intra-body communication 1400. Then, an associate request 1405 (SSID1) is transmitted from the headphone A1 to the audio player B1. Subsequently, an associate response 1410 is transmitted from the audio player B1 to the headphone A1. Subsequently, a connection through the first WPAN (SSID1) 1415 is established. In response to a start stream request 1420 from the headphone A1 to the audio player B1, a streaming MP3 message 1425 is transmitted from the audio player B1 to the headphone A1 to play back MP3 content.

In a similar manner, a second WPAN between the headphone A2 and the audio player B2 can be established. For this purpose, the second user Mary simultaneously touches the second headphone A2 and the second audio player B2 to allow intra-body communication 1450 between the second headphone A2 and the second audio player B2. Subsequently, an associate request 1455 (SSID2) is transmitted from the second headphone A2 to the second audio player B2. After this, an associate response message 1460 is transmitted from the second audio player B2 to the second headphone A2. Then, a connection through a second WPAN (SSID2) 1465 is established. A start-stream request 1470 is transmitted from the second headphone A2 to the second audio player B2. Subsequently, a streaming MP3 message 1475 is transmitted from the second audio player B2 to the second headphone A2, so that audio content stored in (or provided by) the second audio player B2 is emitted in the form of acoustic waves by the second headphone A2.

Figure 15:
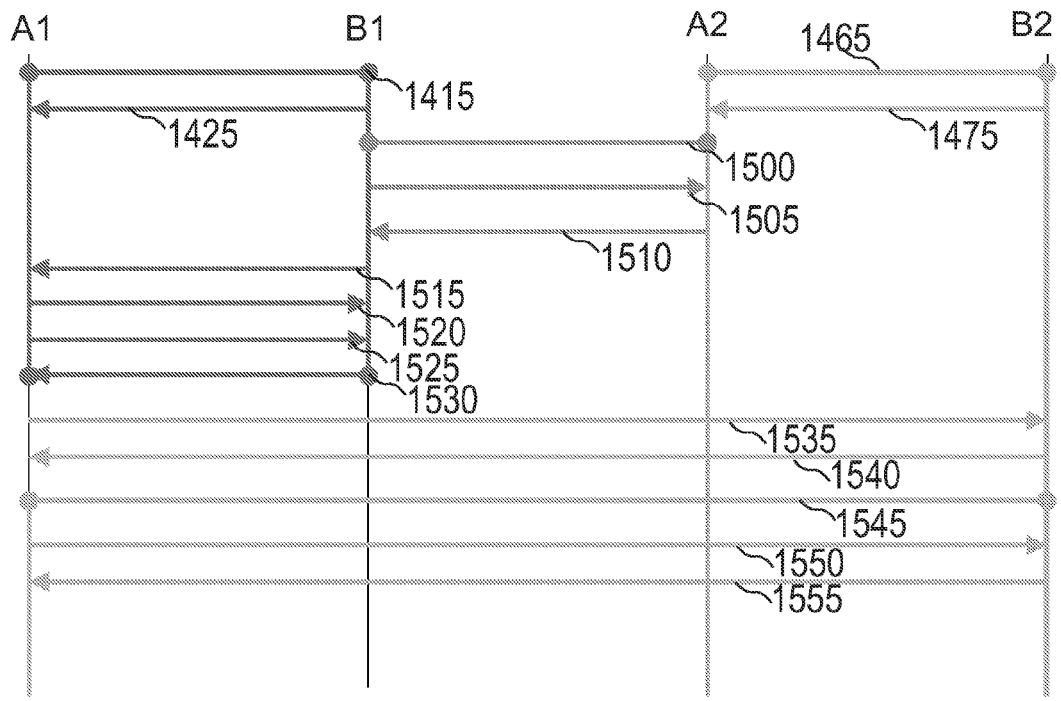
FIG. 15 is a schematic diagram illustrating the system of FIG. 14 being operated in one network so that music is shared between two users.

Referring to FIG. 15, a communication diagram will be described, illustrating the system of FIG. 14 in a scenario in which it is operated in a single common network so that music can be shared between users Bob and Mary.

In particular, FIG. 15 shows how the music-sharing operation state is initiated. Initially, the first WPAN connection 1415 is established between the first headphone A1 and the first audio player B2. Furthermore, the second WPAN connection 1465 is established between the second headphone A2 and the second audio player B2. Thus, an MP3 stream 1425 is transmitted from the first audio player B1 to the first headphone A1. In the second WPAN, an MP3 stream 1475 is transmitted from the second audio player B2 to the second headphone A2.

To share music with Mary, Bob touches his own audio player B1 and simultaneously Mary's headphone A2 in a touch step 1500. Via intra-body communication, a connection request 1505 is transmitted from the first audio player B1 to the second headphone A2. Subsequently, a connection-accept message 1510 is transmitted from the second headphone A2 to the first audio player B1 (SSID2), again via intra-body communication. Then, a connection-accept message 1515 is transmitted from the first audio player B1 to the first headphone A1 in a wireless manner. After that, a stop-stream request 1520 is transmitted from the first headphone A1 to the first audio player B1. Furthermore, a dissociation request 1525 is transmitted from the first headphone A1 to the first audio player B1. A dissociation response message 1530 is subsequently transmitted from the first audio player B1 to the first headphone A1.

After this, an associate request 1535 is transmitted from the first headphone A1 to the second audio player B2 (SSID2). As a reaction, an associate response 1540 is transmitted from the second audio player B2 to the first headphone A1. Consequently, a connection 1545 is established through the second WPAN (SSID2). Subsequently, a start-stream request 1550 is transmitted from the first headphone A1 to the second audio player B2. As a response, streaming MP3 data 1555 are transmitted from the second audio player B2 to the first headphone A1.

The way in which the music-sharing between Bob and Mary is stopped will now be described with reference to FIG. 16.

Figure 16:
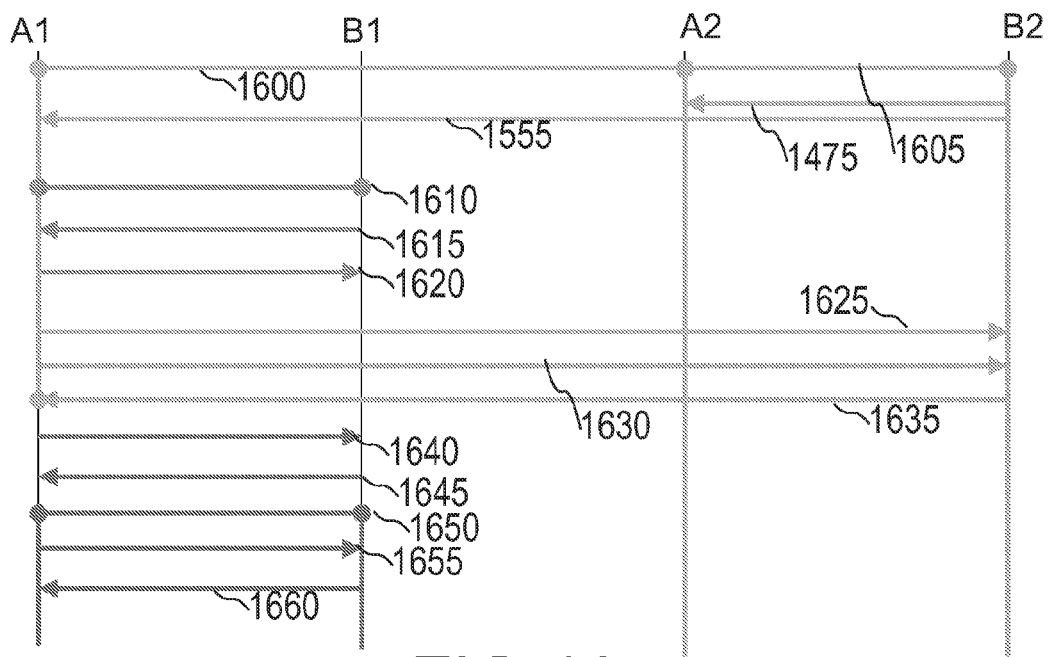
FIG. 16 is a schematic diagram illustrating the system of FIG. 14 being operated in one network wherein music is no longer shared between two users.

As can be seen from FIG. 16, the first headphone A1 and the second headphone A2 are connected via the second WPAN (connection 1600), and the second headphone A2 and the second audio player B2 are connected via the second WPAN as well (connection 1605). Via the second WPAN, a streaming MP3 message 1475 is transmitted from the second audio player B2 to the second headphone A2, and a streaming MP3 message 1555 is sent from the second audio player B2 to the first headphone A1, so that both headphones A1 and A2 are operative.

When user Bob simultaneously touches his own audio player B1 and his own headphone A1 in a touch step 1610, a connection request 1615 is transmitted from the first audio player B1 to the first headphone A1 via intra-body communication. Consequently, a connection-accept message 1620 is transmitted from the first headphone A1 to the first audio player B1 (SSID1).

Then, a stop-stream request 1625 is transmitted from the first headphone A1 to the second audio player B2. Moreover, a dissociation request 1630 is transmitted from the first headphone to the second audio player B2. As a reaction, a dissociation response 1635 is transmitted from the second audio player B2 to the first headphone A1. The messages 1475, 1555, 1625, 1630, 1635 are transmitted via the second WPAN.

Messages exchanged between the devices A1, B1 connected via the first WPAN will now be described.

The first headphone A1 sends an associate request 1640 to the first audio player B1. Then, an associate response 1645 is transmitted from the first audio player B1 to the first headphone A1. After this, a connection via the connection 1650 through the first WPAN is established (SSID1). Then, a start-stream request 1655 is transmitted from the first headphone A1 to the first audio player B1. In response thereto, a streaming MP3 message 1660 is transmitted from the first audio player B1 to the first headphone A1, so that the music played back by the first headphone A1 relates to content stored in the first audio player B1.

The scenario described with reference to FIGS. 14 to 16 relates to a "slave-centric" approach. FIG. 14 shows how two separate networks are established. FIG. 15 shows how the music-sharing is started, and FIG. 16 shows how the music-sharing is stopped.

According to the described embodiment, every audio player/headset has an associated preconfigured network ID (SSID) and an address of its headset/player. To start streaming from a player to a headset, the player needs to know the network address of the headset, and vice versa. In addition to the network ID (SSID), the address of the headset and the player is therefore also transmitted.

If not connected to a player, a headset associates with its preconfigured network and player. If connected to a player, a headset responds to an incoming connection request with a connection-accept message containing its preconfigured SSID and player address.

A player starts streaming to a headset in response to a "start-streaming request" message containing the address of the target headset.

According to the embodiment of FIGS. 14 to 16, a touch sensor may be provided in the headset and in the player. A headset or a player can detect that it is being touched and thereby triggers a corresponding action depending on its current operation state. Random timers can therefore be dispensed with. The scenario is asymmetrical, i.e. a player that is connected always sends a connection request through intra-body communication in response to being touched. A headset that is connected always listens for incoming connection requests through intra-body communication in response to being touched. Devices being disconnected start to connect to their partner device (i.e. to its associated device) in response to being touched.

Referring again to FIG. 14, headsets and players are preconfigured with their SSID and address of their partner devices. Referring to FIGS. 15 and 16, a connected headset being touched responds to an intra-body communication connection request with a connection-accept message containing its preconfigured SSID and player address. A player receiving a connection accept message may check whether the SSID/player address parameters therein match its preconfigured SSID/player address. If they match, the case of FIG. 16 prevails (stop sharing), otherwise the case of FIG. 15 prevails (start sharing).

Figure 18:
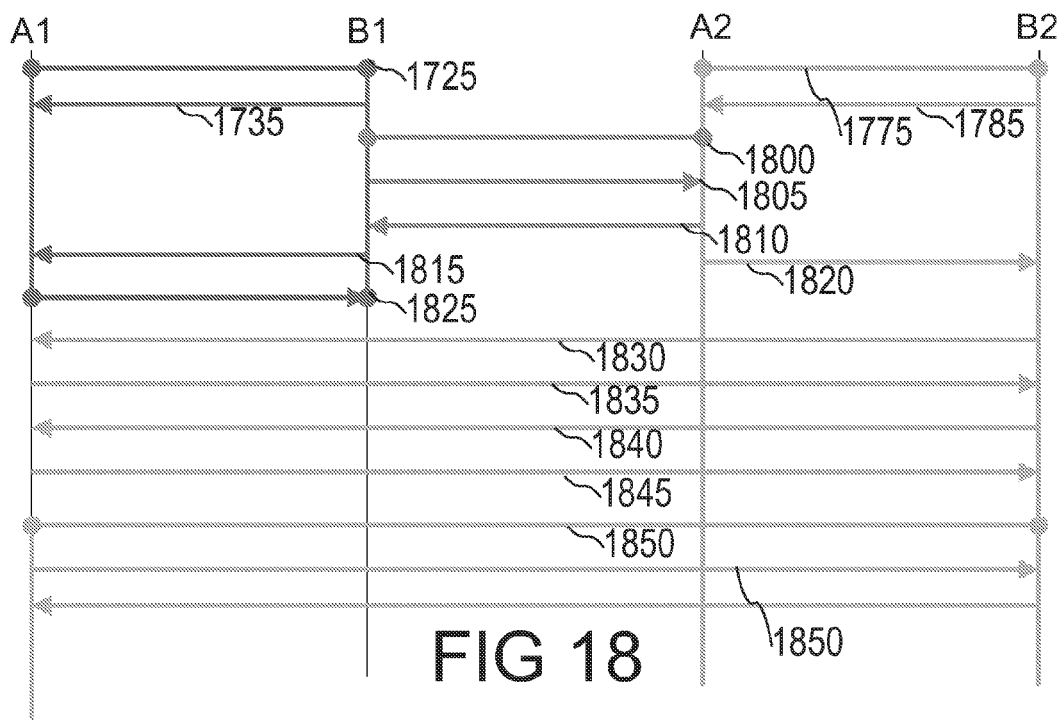
FIG. 18 is a schematic diagram illustrating the system of FIG. 17 being operated in one network so that music is shared between two users.
Figure 19:
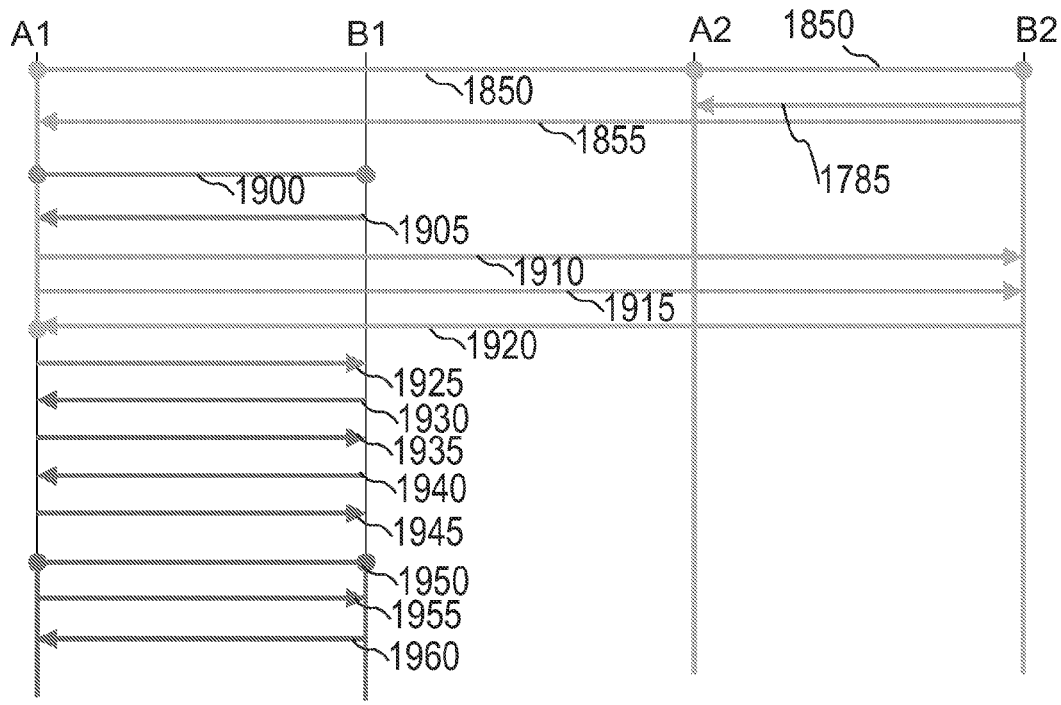
FIG. 19 is a schematic diagram illustrating the system of FIG. 17 being operated in one network wherein music is no longer shared between two users.

It will now be described with reference to FIGS. 17 to 19 how music can be shared between two users ("master-centric" approach) in a Bluetooth network.

Figure 17:
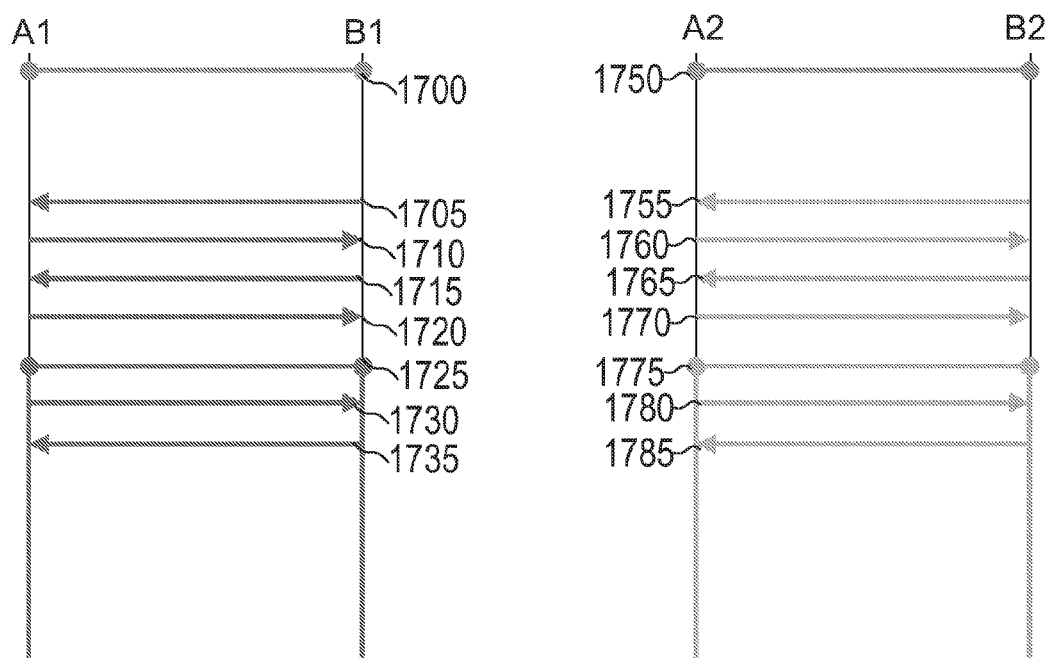
FIG. 17 is a schematic diagram illustrating a system of two audio players and two wireless headphones being operated in two separate Bluetooth networks.

FIG. 17 shows a scenario in which the first headphone, or headset, A1 is connected with the first audio player B1 via a first Bluetooth network, and the second headphone, or headset, A2 is connected with the second audio player B2 via a second Bluetooth network.

To establish the first Bluetooth network, user Bob simultaneously touches the first headphone A1 and the first audio player B1 (touch step 1700). Then, a page request 1705 is transmitted from the first audio player B1 with the first headphone A1. Subsequently, a page response message 1710 is transmitted from the first headphone A1 to the first audio player B1. A connection request 1715 is subsequently transmitted from the first audio player B1 with the first headphone A1, and a connection response message 1720 is transmitted from the first headphone A1 to the first audio player B1. Consequently, a connection 1725 through a first Piconet or first Bluetooth network is established, wherein the audio player B1 acts as the master within this network. Then, a start-stream request 1730 is transmitted from the first headphone A1 to the first audio player B1, and a streaming MP3 message 1735 is transmitted from the first audio player B1 to the first headphone A1, so that audio content stored in the first audio player B1 is reproduced by an emission of acoustic waves of the headphone A1.

In a similar manner as described for A1 and B1, a second Piconet or second Bluetooth communication network is established between the second headphone A2 and the second audio player B2. For this purpose, user Mary touches the second headphone A2 and the second audio player B2 simultaneously (step 1750). Then, a page request 1755 is transmitted from the second audio player B2 to the second headphone A2. As a consequence, a page response message 1760 is transmitted from the second audio player A2 to the second headphone B2. Then, a connection request 1765 is transmitted from the second audio player B2 to the second headphone A2. A connection response message 1770 is then transmitted from the second headphone A2 to the second audio player B2. This establishes a connection 1775 between the second headphone A2 and the second audio player B2. This connection 1775 is mediated through a second Bluetooth network or a second Piconet network, wherein the second audio player B2 is the master in this network.

Then, a start-stream request 1780 is sent from the second headphone A2 to the second audio player B2. Subsequently, a streaming MP3 message 1785 is transmitted from the second audio player B2 to the second headphone A2 so that audio content stored in the second audio player B2 is played back via the emission of acoustic waves by the second headphone A2.

It will now be described with reference to FIG. 18 in which way Bob and Mary start sharing music via a common Bluetooth network.

As described above, the connection 1725 (a Bluetooth Piconet connection with the first audio player B1 as a master) is established. Furthermore, streaming MP3 messages 1735 are transmitted from the first audio player B1 to the first headphone A1. In a similar manner, the second Bluetooth Piconet network 1775, which is separate from the previously described first Bluetooth Piconet network 1725, is already established between the second headphone A2 and the second audio player B2. Within the framework of the latter network communication, the streaming MP3 message 1785 is transmitted from the second audio player B2 to the second headphone A2.

When first user Bob simultaneously touches the first audio player B1 and the second headphone A2 in a touch step 1800, a connection request 1805 is transmitted from the first audio player B1 to the second headphone A2 via intra-body communication. A connection-accept message 1810 is transmitted from the second headphone A2 to the first audio player B1, again via intra-body communication. Then, a disconnect request 1815 is transmitted from the first audio player B1 to the first headphone A1, and a connection-request message 1820 is transmitted from the second headphone A2 to the second audio player B2. A disconnect-response message 1825 is transmitted from the first headphone A1 to the first audio player B1.

Subsequently, a page-request message 1830 is transmitted from the second audio player B2 to the first headphone A1. Afterwards, a page-response message 1835 is transmitted from the first headphone A1 to the second audio player B2. Then, a connection-request message 1840 is transmitted from the second audio player B2 to the first headphone A1. Subsequently, a connection-accept message 1845 is sent from the first headphone A1 to the second audio player B2. Consequently, a common Bluetooth Piconet network connection 1850 is established between the first headphone A1 and the second audio player B2. In response to a start-streaming request 1850 of the first headset A1 to the second audio player B2, a streaming MP3 message 1855 is transmitted from the second audio player B2 to the first headset A1, so that music stored in the second audio player B2 is played back via the first headset A1.

It will now be described with reference to FIG. 19 how the sharing of music between Bob and Mary as established according to FIG. 18 can be terminated.

A streaming MP3 message 1785 is sent from the second audio player B2 to the second headphone A2, and a streaming MP3 message 1855 is sent from the second audio player B2 to the first headphone A1.

When first user Bob simultaneously touches the first audio player B1 and the first headphone A1, see touch step 1900, then a connection request 1905 is transmitted from the first audio player B1 to the first headphone A1. Subsequently, a stop-stream request 1910 is transmitted from the first headphone A1 to the second audio player B2, and afterwards a disconnect request 1915 is sent from the first headphone A1 to the second audio player B2. Consequently, a disconnect-response message 1920 is transmitted from the second audio player B2 to the first headphone A1.

Then, a connection-accept message 1925 is transmitted from the first headphone A1 to the first audio player B1. This results in a page-request message 1930 transmitted from the first audio player B1 to the first headphone A1. Then, a page-response message 1935 is transmitted from the first headphone A1 to the first audio player B1. A connection-request message 1940 is then sent from the first audio player B1 to the first headphone A1. After this, a connection-response message 1945 is transmitted from the first headphone A1 to the first audio player B1. This results in a connection 1950 between the first headphone A1 and the first audio player B1 in a separate Bluetooth Piconet network with the first audio player B1 being the master.

Then, a start-stream request 1955 is transmitted from the first headphone A1 to the first audio player B1, and a streaming MP3 request 1960 is sent from the first audio player B1 to the first headphone A1, so that content stored in the first audio player B1 is played back via the emission of acoustic waves by the first headphone A1.

As is shown in FIG. 17, a player is preconfigured with an address of its partner headset. Referring to FIGS. 18 and 19, a connected player being touched sends an intra-body communication connection request containing its preconfigured headset address. A headset receiving a connection request checks whether the headset address information therein matches its preconfigured headset address information. If it matches, the scenario shown in FIG. 19 prevails (stop sharing), otherwise the scenario shown in FIG. 18 prevails (start sharing).

A system similar to that shown in FIGS. 15 and 16 will now be described with reference to FIGS. 20 and 21, with the main difference that the first headphone A1 is connected with the first audio player B1 in a wired manner, and the second headphone A2 is connected with the second audio player B2 in a wired manner (similarly as in the case shown in FIG. 13). In other words, the headphones A1, A2 are connected to the respective players B1 and B2 by cables, and streaming occurs between the players B1, B2 via a WPAN.

Figure 20:
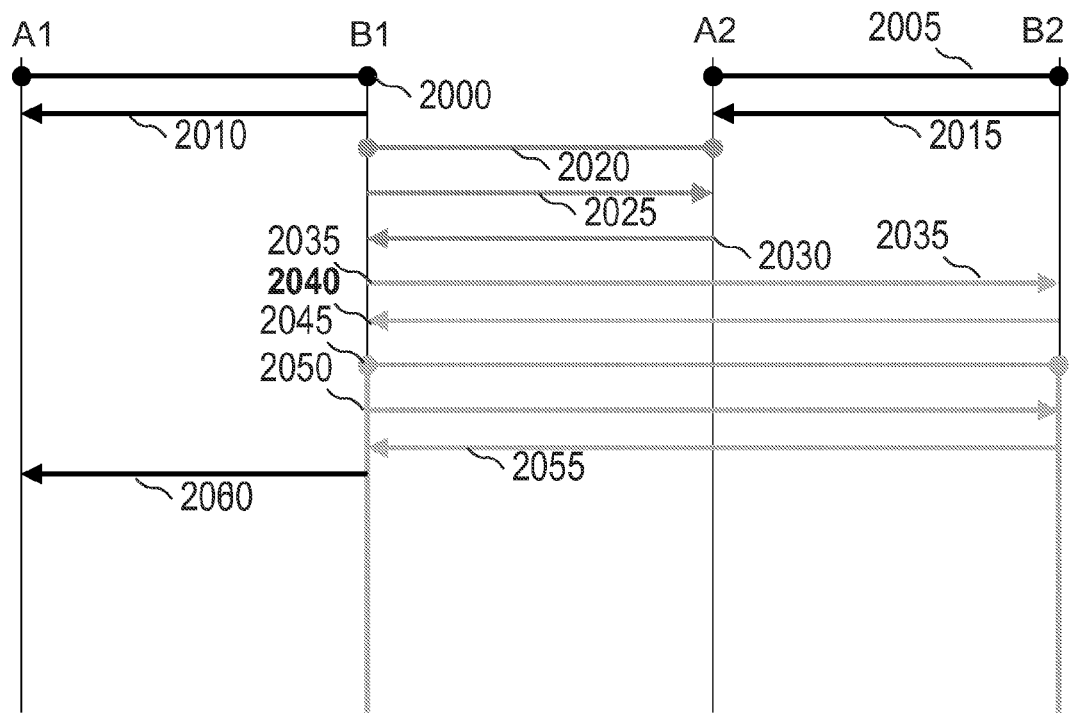
FIG. 20 is a diagram similar to that of FIG. 15 for a system of two audio players and two wired headphones.
Figure 21:
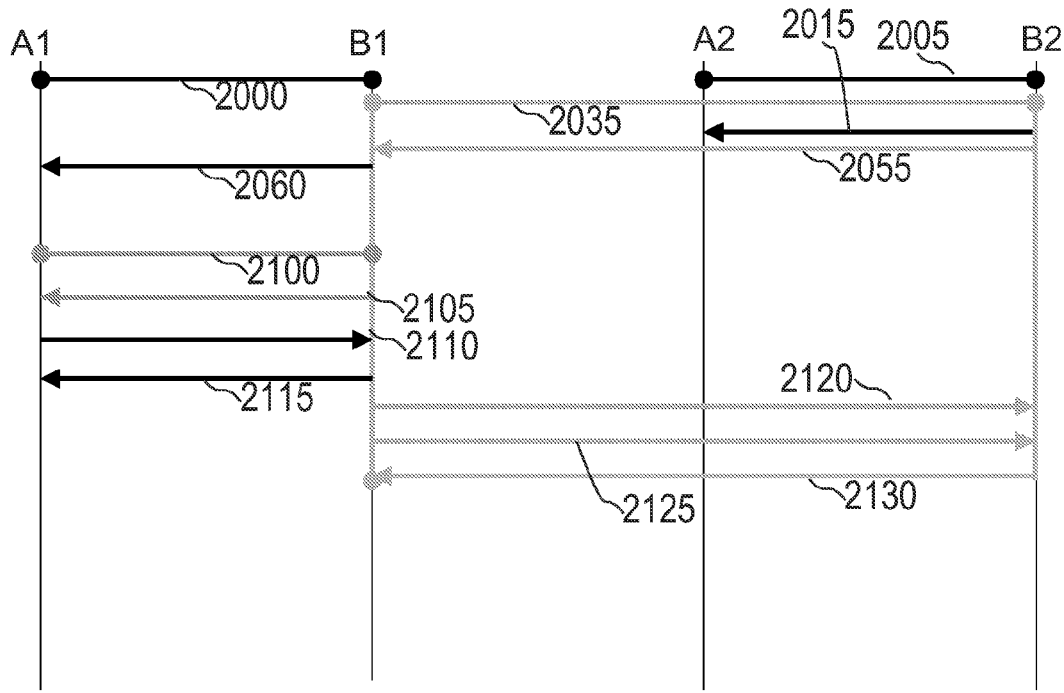
FIG. 21 is a diagram similar to that of FIG. 16 for a system of two audio players and two wired headphones.

As is shown in FIG. 20, a wired communication path 2000 is realized between the first headphone A1 and the first audio player B1. Furthermore, a wired communication path 2005 is realized between the second headphone A2 and the second audio player B2. A streaming MP3 message 2010 is transmitted from the first audio player B1 to the first headphone A1 via the wired connection 2000. In a similar manner, streaming MP3 messages 2015 are transmitted from the second audio player B2 to the second headphone A2 via the wired connection 2005.

When first user Bob simultaneously touches the first audio player B1 and the second headphone A2 in a touch step 2020, a connection request 2025 is transmitted from the first audio player B1 to the second headphone A2 via intra-body communication. Furthermore, a connection-accept message 2030 is sent from the second headphone A2 to the first audio player B1 (SSID2), again via intra-body communication.

Then, an associate request 2035 is transmitted from the first audio player B1 to the second audio player B2, and an associate response 2040 is transmitted from the second audio player B2 to the first audio player B1. A WPAN connection 2045 is established between the first audio player B1 and the second audio player B2. In response to a start-stream request 2050 from the first audio player B1 to the second audio player B2, a streaming MP3 message 2055 is transmitted from the second audio player B2 to the first audio player B1, and from there, the MP3 data are forwarded via a streaming MP3 message 2060 (i.e. in a wired manner) to the first headphone A1. Then, the audio data played back by the first headphone A1 relate to audio content stored in the second audio player B2.

It will now be described with reference to FIG. 21 how the shared music operation mode is stopped with the wired headsets A1 and A2.

For terminating the music-sharing operation mode, first user Bob simultaneously touches his own audio player B1 and headphone A1 in a touch step 2100. Consequently, a connection request 2105 is transmitted from the first audio player B1 to the first headphone A1. Then, a start-stream request 2110 is transmitted from the first headphone A1 to the first audio player B1. Consequently, streaming MP3 messages 2115 are transmitted from the first audio player B1 to the first headphone A1, so that the first headphone A1 reproduces audio data stored in the first audio player B1.

Moreover, a stop-stream request 2120 is transmitted from the first audio player B1 to the second audio player B2, and a dissociation request 2125 is transmitted from the first audio player B1 to the second audio player B2. In response to this dissociation request 2125, the second audio player B2 transmits a dissociation response message 2130 to the first audio player B1.

A system similar to that described in FIGS. 17 to 19 will now be described with reference to FIGS. 22 and 23 for the case in which the communication between the first headphone A1 and the first audio player B1 and between the second headphone A2 and the second audio player B2 is carried out in a wired manner.

Figure 22:
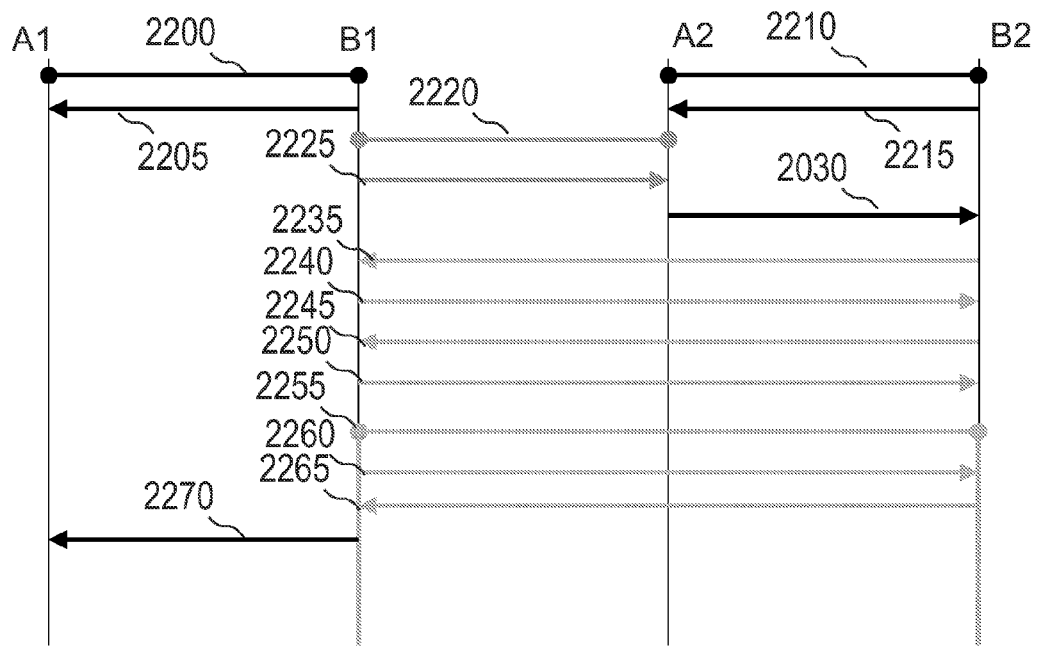
FIG. 22 is a diagram similar to that of FIG. 18 for a system of two audio players and two wired headphones.

Thus, FIG. 22 shows how a music-sharing operation mode can be started with wired headsets and the establishment of a Bluetooth network.

The first headphone A1 is connected to the first audio player B1 through a wired connection 2200. Thus, streaming MP3 messages 2205 are transmitted from the first audio player B1 to the first headphone A1. Similarly, a wired connection 2210 is established between the second headphone A2 and the second audio player B2. Within the framework of this wired connection, a streaming MP3 message 2215 is transmitted from the second audio player B2 to the second headphone A2.

When user Bob simultaneously touches the first audio player B1 and the second headphone A2 in a touch step 2220, a connection request 2225 is transmitted from the first audio player B1 to the second headphone A2 via intra-body communication. Consequently, a connection request 2230 is transmitted from the second headphone A2 to the second audio player B2. Then, a page request 2235 is transmitted from the second audio player B2 to the first audio player B1, and in response to this, a page-response message 2240 is transmitted from the first audio player B1 to the second audio player B2. Subsequently, a connection request 2245 is transmitted from the second audio player B2 to the first audio player B1, and a connection-accept message 2250 is transmitted from the first audio player B1 to the second audio player B2.

Consequently, a Piconet network is established as a connection 2255 between the first audio player B1 and the second audio player B2. Then, a start-stream request 2260 may be transmitted from the first audio player B1 to the second audio player B2. As a response, a streaming MP3 message 2265 is transmitted from the second audio player B2 to the first audio player B1, and is conveyed from there as a streaming MP3 message 2270 to the first headphone A1, so that the first headphone A1 plays back audio content stored in the second audio player B2.

Figure 23:
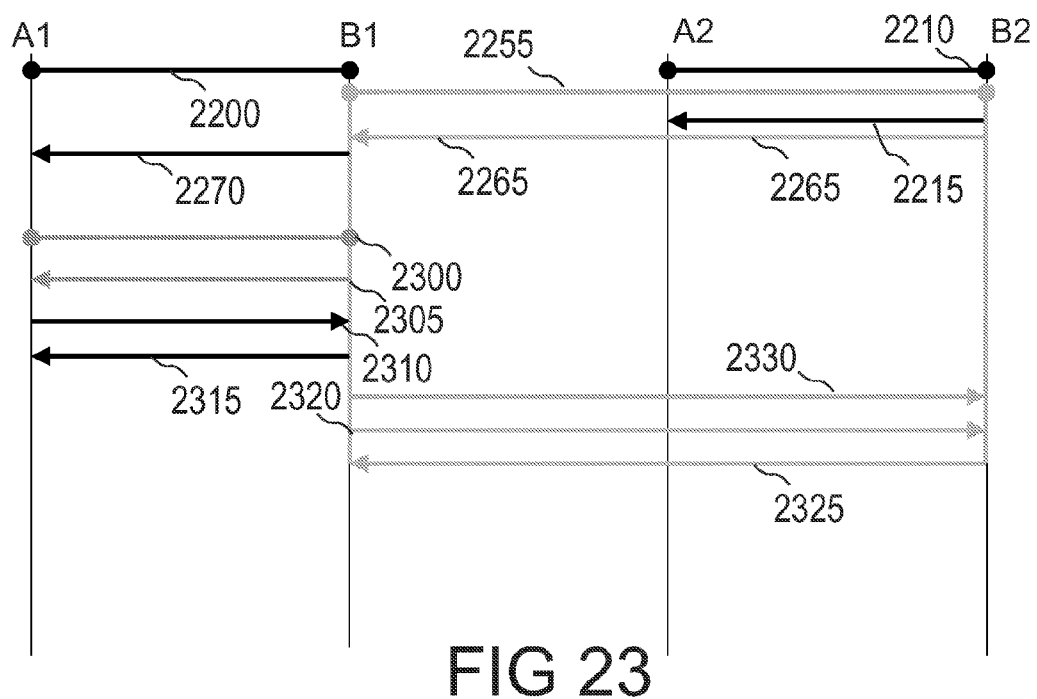
FIG. 23 is a diagram similar to that of FIG. 19 for a system of two audio players and two wired headphones.

With reference to FIG. 23, it will now be described for the system shown in FIG. 22 how the music-sharing operation mode is stopped with wired headsets and the Bluetooth communication path between the two wired networks.

When Bob simultaneously touches the first audio player B1 and the first headphone A1 in a touch step 2300, a connection request 2305 is sent from the first audio player B1 to the first headphone A1. As a consequence, a start-stream request 2310 is transmitted via the wired connection 2200 in a step 2310. Furthermore, a streaming MP3 message 2315 is transmitted from the first audio player B1 to the first headphone A1.

Furthermore, a stop-stream request 2330 is transmitted from the first audio player B1 to the second audio player B2 which is followed by a disconnect-response message 2320. Then, a disconnect-response message 2325 is transmitted from the second audio player B2 to the first audio player B1.

Thus, FIGS. 22 and 23 show a configuration in which the headphones are wired to the players, and the streaming between the players is realized via Bluetooth. A further embodiment according to the invention will be explained hereinafter with reference to FIGS. 24A to 24C.

Figure 24A:
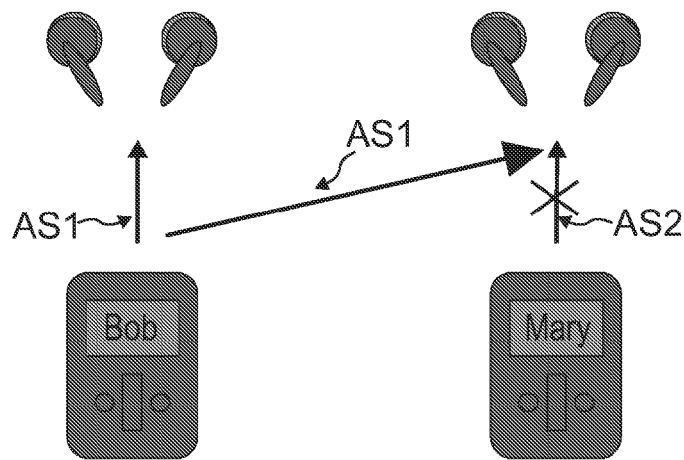
FIGS. 24A to 24C show set-ups of a wireless network for a shared music listening experience between users, based on network devices according to the invention.
Figure 24B:
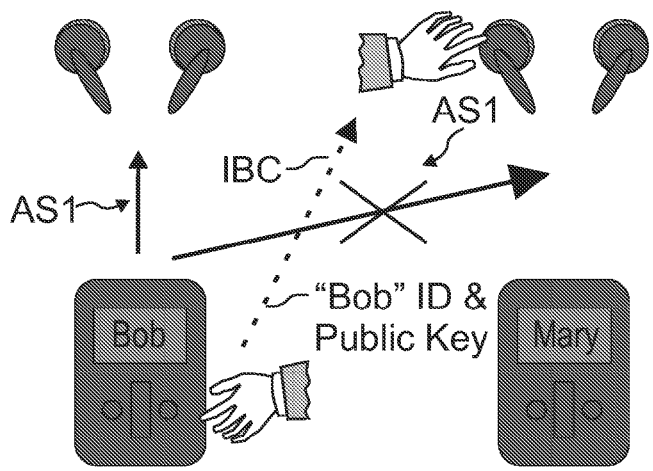
Figure 24C:
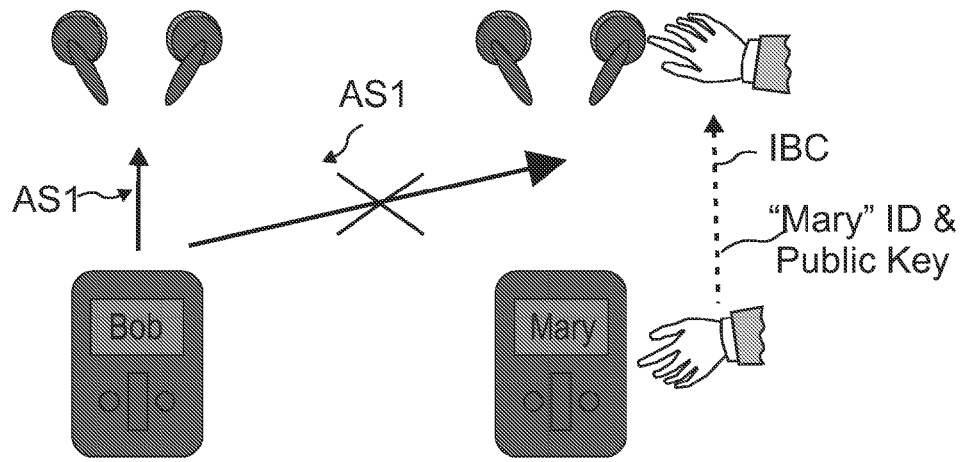

The embodiment shown in FIGS. 24A to 24C is similar to that shown in FIGS. 12A to 12E and shows an alternative possibility of the way in which two users, Bob and Mary, may share music.

The initial situation, before sharing music, is shown in FIG. 12A, i.e. Bob listens, via headphone A1, to music AS1 played back by his own audio player B1. Accordingly, Mary listens, via headphone A2, to music AS2 played back by her own audio player B2.

As is shown in FIG. 12B, Bob may simultaneously touch a touch interface of the audio player B1 and of the headphone A2. According to the described embodiment, this has the consequences as illustrated in FIGS. 24A to 24C and as described hereinafter.

As is shown in FIG. 24A, Bob initiates that, by simultaneously touching the touch interface of the audio player B1 and of the headphone A2, the music currently played back on Bob's audio player B1 and the headphone A1 will also be played back by Mary's headphone A2. Thus, according to the embodiment shown in FIGS. 24A to 24C, Bob provides Mary with his music, whereas, according to the embodiment shown in FIGS. 12A to 12E, he takes Mary's music.

As is shown in FIG. 24B, Bob initiates that, by simultaneously touching the touch interface of the audio player B1 and of the headphone A2 again, the playback of music from the audio player B1 on the headphone A2 is terminated.

Alternatively, as is shown in FIG. 24C, Mary initiates that, by simultaneously touching the touch interface of the audio player B2 and of the headphone A2, the playback of music from the audio player B1 on the headphone A2 is terminated.

As a consequence of the action shown in FIG. 24B or that shown in FIG. 24C, a situation similar to that shown in FIG. 12E will occur. This means that the headphone A1 again plays back music reproduced by the audio player B1, and the headphone A2 again plays back music reproduced by the audio player B2.

This embodiment shown in FIGS. 24A to 24C relates to the fact that when user Bob touches A2 and B1, he "gives" his music to user Mary instead of user Bob "getting" the music from user Mary (as in the case of FIGS. 12A to 12E). This results in a different network communication. Referring to FIG. 24B, the same gesture of touching B1 and A2 is used to stop the sharing again. This gives user Bob full control of who is listening when to his music, as he can start and stop it. Alternatively, or complementarily, it is also possible that user Mary touches B2 and A2 to stop the sharing, which is depicted in FIG. 24C. This gives more control to user Mary about how long she wants to listen to the music sharing.

With the technology described in this application, user Mary or Bob could also touch B1 and B2 (or A1 and A2) to start or stop the sharing process as explained with reference to FIGS. 12A to 12E and FIGS. 24A to 24C. The system according to the invention may also be configured to discriminate who (i.e. which user) is touching both devices, for instance, when the touch interface comprises a fingerprint sensor, a DNA sensor or any other discrimination means. The reaction of the system can then be made dependent on which user currently touches the touch interfaces.

As far as process diagrams for the embodiments shown in FIGS. 24A to 24C are concerned, reference is made to the similar diagrams in FIGS. 16 to 23.

It should be noted that use of the verb "comprise" and its conjugations does not exclude the presence of elements or steps other than those stated in the claims, and use of the indefinite article "a" or "an" preceding an element or step does not exclude a plurality of such elements or steps. Elements described in association with different embodiments may also be combined.

It should also be noted that reference signs in the claims shall not be construed as limiting the scope of the claims.

The invention claimed is:

1. A device (B1) capable of being operated within a network, the device (B1) comprising:

a touch interface for detecting that a user touches the touch interface and simultaneously touches a touch interface of another device (A2) capable of being operated within a said network; and a communication unit for communicating with a communication unit of the another device (A2) via a communication network, separate from the body of the user, established between the device (B1) and the another device (A2) when the touch interface detects that the user touches the touch interface of the device (81) and simultaneously touches the touch interface of the another device (A2), wherein the another device (A2) is adapted to reproduce acoustic and/or visual content, wherein the device (B1) is adapted to store reproducible acoustic and/or visual content to be reproduced by a further device (A1), and wherein the further device (A1) is controlled to terminate reproducing acoustic and/or visual content stored in the device (B1) and start reproducing acoustic and/or visual content which is currently being reproduced in the another device (A2) when the touch interface detects that the user touches the touch interface of the another device (A2) and simultaneously touches the touch interface of the device (B1), said acoustic and/or visual content being reproduced in the another device (A2) being communicated from the another device (A2) to the further device (A1) via the communication unit in the another device (A2), the communication network and the communication unit in the device (B1).

2. The device (B1) as claimed in claim 1, wherein the touch interface, when detecting that the user touches the touch interface and simultaneously touches the touch interface of the another device (A2), exchanges data (MIS) with the touch interface of the another device (A2), said data (MIS) being required for establishing the communication network.

3. The device (B1) as claimed in claim 1, wherein the touch interface, when detecting that the user touches the touch interface and simultaneously touches the touch interface of the another device (A2), exchanges data (MIS) with the touch interface of the another device (A2), said data (MIS) being required for establishing the network via intra-body communication.

4. The device (B1) as claimed in claim 1, wherein the touch interface, exclusively when detecting that the user touches the touch interface and simultaneously touches the touch interface of the another device (A2), starts sending data (MIS) to the touch interface of the other device (B), said data (MIS) being required for establishing the network.

5. The device (B1) as claimed in claim 1, wherein the touch interface periodically sends data (MIS), said data (MIS) being required for establishing the network, in such a manner that said data (MIS) are receivable by the touch interface of the another device (A2) only when the user touches the touch interface and simultaneously touches the touch interface of the another device (A2).

6. The device (B1) as claimed in claim 1, wherein the communication unit communicates with the communication unit of the another device (A2) in a wireless manner.

7. The device (B1) as claimed in claim 1, wherein the communication unit communicates with the communication unit of the another device (A2) according to a communication protocol selected from the group consisting of: a Wireless Local Area Network, a Wireless Personal Area Network, a Bluetooth Network and a ZigBee Network.

8. The device (B1) as claimed in claim 1, wherein the communication unit communicates with the communication unit of the another device (A2) to exchange application data.

9. The device (B1) as claimed in claim 1, wherein said device (B1) further comprises:
a connector unit coupled to the touch interface and to the communication unit, said connector unit activating the communication unit only when the touch interface detects that the user touches the touch interface of the device (B1) and simultaneously touches the touch interface of the another device (A2).

10. The device (B1) as claimed in claim 1, wherein said device (B1) automatically establishes the communication network when the touch interface detects that the user touches the touch interface of the device (B1) and simultaneously touches the touch interface of the another device (A2).

11. The device (B1) as claimed in claim 1, wherein said device (B1) joins an existing communication network in which the another device (A2) has already been operated before, when detecting that the user touches the touch interface of the device (B1) and simultaneously touches a touch interface of the another device (A2).

12. The device (B1) as claimed in claim 1, wherein said device (B1) joins an existing communication network in which the another device (A2) has already been operating as a master before, when detecting that the user touches the touch interface of the device (B1) and simultaneously touches the touch interface of the another device (a2).

13. The device (B1) as claimed in claim 1, wherein said device (B1) joins an existing communication network in which the another device (A2) has already been operating as a slave before, when detecting that the user touches the touch interface of the device (B1) and simultaneously touches the touch interface of the another device (A2).

14. The device (B1) as claimed in claim 1, wherein the touch interface of the further device (A1) and/or of the device (B1) comprises a user-identifying sensor for identifying a user touching the touch interface of the further device (A1) and simultaneously touching the touch interface of the device (B1).

15. The device (B1) as claimed in claim 1, wherein said device (B1) implements at least one functionality of the group consisting of:
a portable audio player;
a portable video player;
a headphone;
a head-mounted display;
a mobile phone;
a body-worn device;
a medical sensor;
a DVD player;
a CD player;
a hard disk-based media player;
an internet radio device;
a public entertainment device; and
an MP3 player.

16. The network system according to claim 15, comprising a fourth device (B2), comprising a touch interface (2) adapted to detect that a user (3) touches the touch interface (2) and simultaneously touches a touch interface (6) of another device (B) capable of being operated within a network and a communication unit (1) adapted to communicate with a communication unit (5) of the other device (B) via a communication network established between the device (A) and the other device (B) when detecting that the user touches the touch interface (2) of the device (A) and adapted to store reproducible acoustic and/or visual content to be reproduced by the second device (A2); wherein acoustic and/or visual content to be reproduced by the first device (A1) is transmitted from the communication unit of the fourth device (B2) to the communication unit of the first device (A1) when detecting that a user (3) touches the touch interface of the second device (A2) and simultaneously touches the touch interface of the third device (B1).

17. The device (B1) as claimed in claim 16, wherein the further device (A1) terminates reproducing acoustic and/or visual content stored in the fourth device (B2) and start reproducing acoustic and/or visual content stored in the device (B1) when detecting that the user (3) touches the touch interface of the further device (A1) and simultaneously touches the touch interface of the device (B1).

18. The device (B1) as claimed in claim 16, wherein the further device (A1) and the device (B1) are coupled via a wired communication path or via a wireless communication path.

19. A method of operating a device (B1) within a network, the method comprising the steps of:
detecting that a user touches the device (B1) and simultaneously touches another device (A2) capable of being operated within a network;
communicating with the another device (A2) via a communication network, separate from the body of the user, established between the device (B1) and the another device (A2) when detecting that the user touches the device (B1) and simultaneously touches the another device (A2), wherein the another device (A2) reproduces acoustic and/or visual content, the device (B1) stores reproducible acoustic and/or visual content to be reproduced by a further device (A1), and that the method further comprises:

terminating reproducing acoustic and/or visual content stored in the device (B1) at the further device (A1); and starting reproducing acoustic and/or visual content, at the further device (A1), which is currently being reproduced in the another device (A2) when detecting that the user touches the touch interface of the another device (A2) and simultaneously touches the touch interface of the device (B1), wherein, said acoustic and/or visual content being reproduced in the another device (A2) is communicated from the another device (A2) to the further device (A1) via the communication network.

20. A non-transitory computer-readable medium, in which a computer program is stored which, when being executed by a processor of a device (B1), controls a method of operating the device (B1) within a network, the method comprising the steps of:

detecting that a user touches the device (B1) and simultaneously touches another device (A2) capable of being operated within a network;

communicating with the another device (A2) via a communication network, separate from the body of the user, established between the device (B1) and the another device (A2) when detecting that the user touches the device (B1) and simultaneously touches the another device (A2);

terminating reproducing acoustic and/or visual content stored in the device (B1) at a further device (A1); and starting reproducing acoustic and/or visual content, at the further device (A1), which is currently being reproduced in the another device (A2) when detecting that the user touches the touch interface of the another device (A2) and simultaneously touches the touch interface of the device (B1), wherein, said acoustic and/or visual content being reproduced in the another device (A2) is communicated from the another device (A2) to the further device (A1) via the communication network.

* * * * *